United States Patent
Kulikov

(10) Patent No.: US 11,163,779 B1
(45) Date of Patent: Nov. 2, 2021

(54) BINARY REPRESENTATIONS OF OBJECTS BASED ON OBJECT ATTRIBUTES

(71) Applicant: Pinterest, Inc., San Francisco, CA (US)

(72) Inventor: Vitaliy Kulikov, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 737 days.

(21) Appl. No.: 15/829,818

(22) Filed: Dec. 1, 2017

(51) Int. Cl.
| | |
|---|---|
| *G06F 16/00* | (2019.01) |
| *G06F 16/2457* | (2019.01) |
| *G06F 16/248* | (2019.01) |
| *G06F 16/22* | (2019.01) |
| *G06F 16/2455* | (2019.01) |

(52) U.S. Cl.
CPC .... *G06F 16/24578* (2019.01); *G06F 16/2237* (2019.01); *G06F 16/248* (2019.01); *G06F 16/24568* (2019.01)

(58) Field of Classification Search
CPC .............................................. G06F 16/24558
See application file for complete search history.

(56) References Cited

U.S. PATENT DOCUMENTS

| | | | | |
|---|---|---|---|---|
| 7,676,742 B2 * | 3/2010 | Binding | ................ | G06F 40/143 715/242 |
| 2010/0040282 A1 * | 2/2010 | Bala | ........................ | G06T 7/155 382/165 |
| 2013/0290339 A1 | 10/2013 | LuVogt et al. | | |
| 2017/0364517 A1 * | 12/2017 | Kafai | ........................ | H04L 9/00 |
| 2017/0364520 A1 | 12/2017 | Venkataraman et al. | | |

OTHER PUBLICATIONS

Liang Xiang et al., "Temporal Recommendation on Graphs via Long- and Short-term Preference Fusion", KDD'10, Jul. 25-28, 2010, ACM, pp. 723-731. (Year: 2010).*
Zhou et al., "ATRank: An Attention-Based User Behavior Modeling Framework for Recommendation", The Thirty-Second AAAI Conference on Artificial Intelligence, Association for the Advancement of Artificial Intelligence, 2018, pp. 4564-4571. (Year: 2018 ).*

* cited by examiner

*Primary Examiner* — Cheryl Lewis
(74) *Attorney, Agent, or Firm* — Athorus, PLLC

(57) ABSTRACT

The described implementations are operable to determine potential objects of interest to a user based on a blend of the user's long-term behavior and short-term interests. Long term user behavior may be determined for the user over a period of time and represented as continuous data. Short-term interest may be determined based on objects with which the user has recently interacted and attributes of those objects may be represented together as continuous data corresponding to the short-term user interest. The continuous data of the short-term interest and long-term user behavior may be blended to produce a user embedding. The user embedding may then be compared with objects to determine objects that are of potential interest to the user.

19 Claims, 17 Drawing Sheets

|  | 902-1 | 902-2 | 902-3 | 902-4 | 902-5 | 902-6 | 902-7 | 902-8 |
|---|---|---|---|---|---|---|---|---|
|  | $P_1, th_1$ | $P_2, th_2$ | $P_3, th_3$ | $P_4, th_4$ | $P_5, th_5$ | $P_6, th_6$ | $P_7, th_7$ | $P_8, th_8$ |

900

|  | 912-1 | 912-2 | 912-3 | 912-4 | 912-5 | 912-6 | 912-7 | 912-8 |
|---|---|---|---|---|---|---|---|---|
| $OE_1$ | 1 | 1 | 0 | 1 | 0 | 1 | 1 | 1 |
|  | $>th_1$ | $>th_2$ | $<th_3$ | $>th_4$ | $<th_5$ | $>th_6$ | $>th_7$ | $>th_8$ |

904-1

|  | 922-1 | 922-2 | 922-3 | 922-4 | 922-5 | 922-6 | 922-7 | 922-8 |
|---|---|---|---|---|---|---|---|---|
| $OE_2$ | 1 | 1 | 1 | 0 | 0 | 0 | 0 | 0 |
|  | $>th_1$ | $>th_2$ | $>th_3$ | $<th_4$ | $<th_5$ | $<th_6$ | $<th_7$ | $<th_8$ |

904-2

|  | 932-1 | 932-2 | 932-3 | 932-4 | 932-5 | 932-6 | 932-7 | 932-8 |
|---|---|---|---|---|---|---|---|---|
| $OE_3$ | 0 | 1 | 0 | 1 | 0 | 1 | 0 | 0 |
|  | $<th_1$ | $>th_2$ | $<th_3$ | $>th_4$ | $<th_5$ | $>th_6$ | $<th_7$ | $<th_8$ |

904-3

⋮

| $OE_N$ |  |  |  |  |  |  |  |  |
|---|---|---|---|---|---|---|---|---|

BINARY REPRESENTATIONS OF OBJECTS BASED ON OBJECT ATTRIBUTES

BACKGROUND

With the ever-expanding amount of accessible digital content available to users and customers, it continues to become more and more difficult to discover the content for which the user is searching. Several different search techniques exist, such as keyword searching, but there are many inefficiencies in such systems.

BRIEF DESCRIPTION OF THE DRAWINGS

FIG. 9 is a block diagram of a sample index of binary representations of embeddings, according to described implementations.

DETAILED DESCRIPTION

Figure 1A:
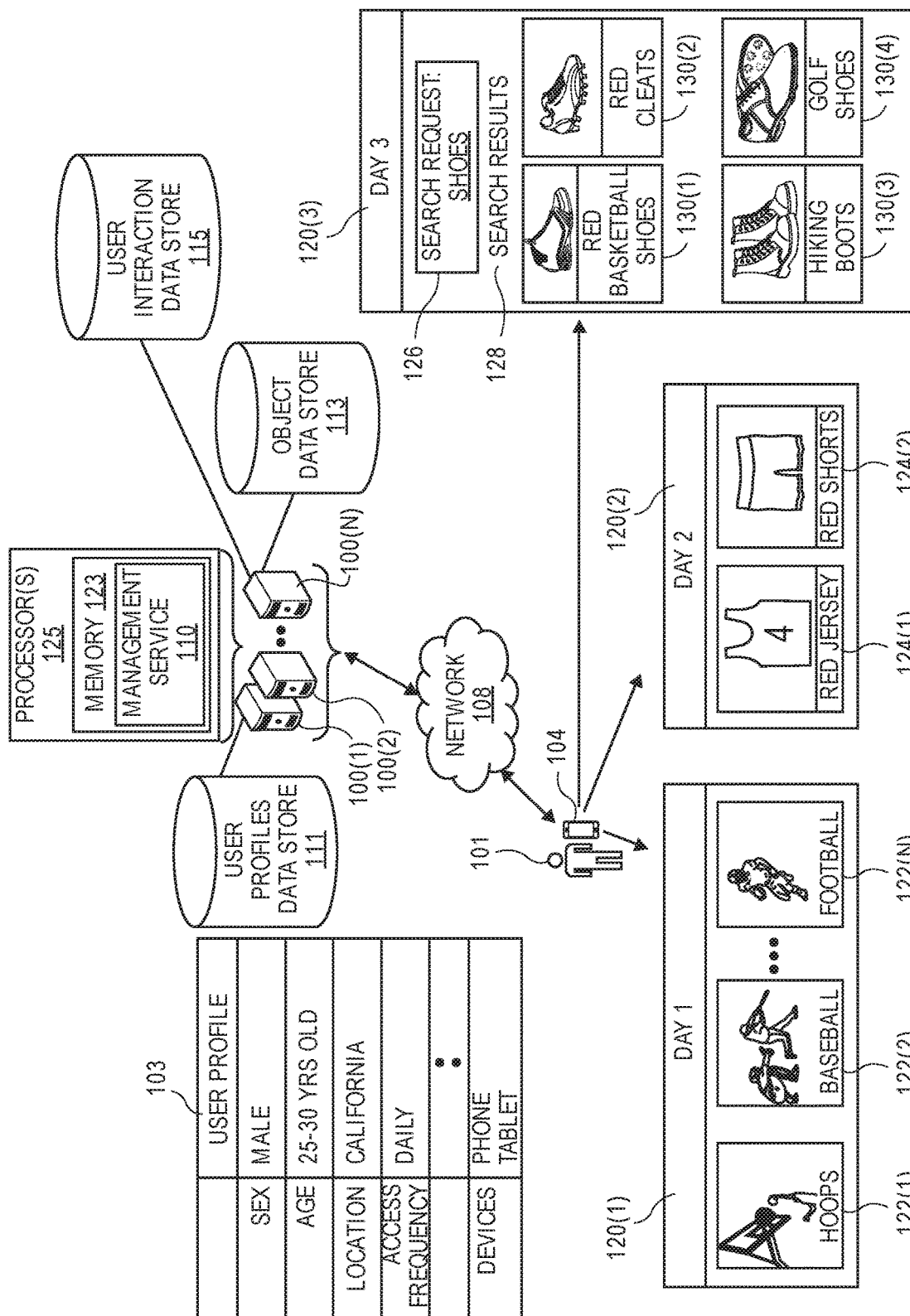
FIG. 1A illustrates an example of a user interacting with objects over a period of time and then a system determining and presenting objects in response to an explicit user input from the user, according to described implementations.

According to aspects of the described implementations, objects of potential interest to a user may be determined and presented to the user based on the implicit behavior or inferred intent or interest of the user. In some implementations, objects, such as images, audio files, collections of objects, user profiles, etc., may be represented as an embedding or embedding vector. In some implementations, an embedding may include continuous data, such as a series of floating point numbers, indicative of object attributes of the object. Object attributes include anything about the object, including, but not limited to, category, colors, type of object, popularity of the object in a social network, age of the object, items represented in the object, etc. As some of those attributes change, such as popularity of the object, the continuous data of the corresponding object embedding may likewise be adjusted to reflect those changes.

An object embedding normalizes object attributes from something qualitative (e.g., words describing the object) to something quantitative (continuous data). As discussed further below, the object embeddings may be utilized to determine which objects are most relevant for a particular user, based on the user's long-term behavior or history and based on other objects with which the user has recently interacted.

Similar to representing objects with continuous data as object embeddings, users may be represented as continuous data, for example, as a plurality of floating point numbers, referred to herein as a user embedding. Like object embeddings, the continuous data of a user embedding may be indicative of user attributes of the user. User attributes may include, for example but not as limitation, features about the user (age, gender, demographic), user location, interaction history of the user with a social network, food preferences of the user, color preferences of the user, etc. In some implementations, as the user interacts with the social network, changes interests, etc., the continuous data of the user embedding will change to reflect the ongoing interaction, interests, and changes of the user.

Utilizing object embeddings and user embeddings, collectively referred to herein as embeddings, objects of potential interest to the user may be determined and presented to the user. Such determination may be independent of keywords and/or direct relationships between potential objects of interest and other objects interacted with by the user. For example, each object embedding and user embedding may be represented as a discrete point or position in a multi-dimensional space and distances between the position of the user embedding and the object embeddings may be determined. Objects corresponding to object embeddings that have the shortest distances to the position of the user embedding are determined to be of potential interest to the user and one or more of those objects may be returned and presented to the user as an object of potential interest to the user.

In other implementations, the implicit behavior or inferred intent of the user may be utilized in conjunction with an explicit input provided by the user, such as a search request, to determine objects of potential interest to the user that correspond to the search request. In one example, the objects of potential interest to the user, based on the inferred intent of the user, may be determined and then ranked or filtered based on the explicit user input to determine and return a ranked list of objects determined to be of potential interest that correspond to the user's explicit input. In other implementations, objects corresponding to the explicit input may be determined, distances between positions of the respective object embeddings of those objects in a multi-dimensional space from the position of the user embedding may be determined and those objects corresponding to the user's explicit input may be ranked based on the inferred intent of the user.

In still other examples, potential explicit inputs, such as frequently submitted search terms, may be represented as an embedding. For example, each time a search term is submitted, the results determined and presented to the user, the system may monitor the results returned and the objects ultimately interacted with by the users in response to those searches. Objects matching the search and that are frequently interacted with by users in response to the search, may be associated as a collection of objects representative of the explicit input. Continuous data representative of that collection of objects may then be generated to form an embedding representative of the explicit input, referred to herein as an explicit input embedding. As discussed further below, because the explicit input embedding is based on a collection of other objects, the continuous data of the explicit input object embedding will be similar to the embeddings corresponding to the objects used to form the explicit input embedding. As such, the distance between the explicit input embedding and the object embeddings of the objects used to form the explicit input embedding will be represented at similar or close positions in a multi-dimensional space.

FIG. 1A illustrates a user access of objects over a period of time and then determination and presentation of objects in response to an explicit input from the user, in this example a search query, according to described implementations. As illustrated, a user 101 may utilize a user device 104, such as a phone, tablet, laptop, desktop, or any other type of computing device, to access objects, such as objects made accessible through a social networking platform that the user may access via a network 108, such as the Internet. For example, a social networking platform maintained by a management service 110 may store a plurality of objects in an object data store 113 and make those objects accessible to users of the social networking platform. The management service 110 and/or the data stores may be maintained on one or more remote computing resources 100 that are accessible by the user device 104 via the network 108.

As illustrated, the remote computing resources 100 may include one or more servers, such as servers 100(1), 100(2) through 100(N). The servers 100(1) through 100(N) may be arranged in any number of ways, such as server farms, stacks, and the like that are commonly used in data centers. Furthermore, the servers 100(1) through 100(N) may include one or more processors 125 and memory 123 which may store the management service 110 and/or the data stores 111, 113, 115, and execute one or more of the processes or features discussed herein.

In this example, during a first period of time, such as a first day 120(1) a user may interact with, via the user device 104, several different objects, such as object 122(1), 122(2), through 122(N). As the user interacts with the objects, such as by selecting to view the objects, selecting to receive additional information about the objects, etc., a management service 110 maintains information about the user and the user's access of those objects during that first period of time. For example, the management service 110 may maintain a user profile 103 about the user 101 that is stored in a user profile data store 111. In this example, the user profile 103 maintains long term information about the user, including, but not limited to, the sex of the user (e.g., male, female), the age or age range of the user, the location of the user, the access frequency with which the user accesses the social network managed by the management service 110, the type of devices or devices associated with the user, etc. As will be appreciated, any form or amount of information about a user may be maintained in a user profile. For example, other information may include food preferences of a user (e.g., vegetarian), color preference, clothing preferences, height, weight, etc.

The management service also maintains user interaction information in a user interactions data store 115 representative of the user's interactions with objects accessible via the social network. For example, the management service maintains in the user interaction data store 115, an indication of the objects interacted with by the user, such as objects 122(1), 122(2) through 122(N), the time period or time of the interaction, such as day 1 120(1), and/or other information about the interaction. As the user continues to interact with various content during the same or different times, the user interactions may be maintained by the management service 110 in the user interactions data store 115.

In the example illustrated in FIG. TA, during a second period of time, Day 2 120(2), the user interacts with two objects 124(1) and 124(2) and the management service updates the user interaction data store 115 to reflect those interactions.

As the user continues to interact with objects, the management system updates the user interaction data store 115 and, as discussed further below, may utilize some or all of that information to determine or infer a short-term user interest or short-term user intent.

Utilizing long term information about the user, as represented by the user profile, and the short-term interest or inferred intent, as represented by objects with which the user has interacted during a recent period of time (also referred to herein as a defined period of time), such as the last two days 120(1) and 120(2), a user embedding may be generated as representative of the user. For example, attributes about the user derived from the user profile 103 may be represented as continuous data. Likewise, attributes of the objects with which the user has interacted during the defined period of time may also be represented as continuous data. The various sets of continuous data (the user continuous data and the objects continuous data) may be combined to form a user embedding that includes continuous data representative of both the long-term user behavior of the user and the short-term interest or inferred intent of the user.

In some implementations objects, such as images, may be processed using one or more machine learning algorithms, such as convolutional neural networks like VGGNet, ResNet, Inception, Xception, etc., and the results or other output of those classifications may include the continuous data representative of those objects that forms the object embeddings. In a similar manner, the user profile and the objects with which the user has interacted during the defined period of time may be processed using one or more machine learning models to produce continuous data representative of the user profile and the objects with which the user has interacted during the defined period of time. That continuous data representative of the user profile and the continuous data representative of the objects with which the user has interacted during the defined period of time may be combined to form the user embedding of continuous data representative of the user.

The defined period of time for which interactions with objects by the user are considered may be, for example, the past twenty-four hours, the past seven days, or any other defined period of time. In some implementations, the continuous data of the user embedding may be updated as the user interacts with additional objects. For example, as discussed herein, as the user interacts with presented objects, those interactions may be utilized to update the continuous data of the user embedding. As the continuous data of the user embedding is updated, the determined potential objects of interest may change or likewise be updated. Such updating of the continuous data of the user embedding and the determined objects of potential interest may be done in real time, or near real time, or at any defined interval, etc.

Returning to FIG. 1A, in this example during a third period of time, Day 3 120(3), the user 101, via the user device 104, accesses the social network and submits an explicit input, in this example, a search request 126 for "Shoes." The management service 110, upon receiving the explicit input, generates the user embedding for the user 101, as discussed herein, based on the user profile 103 and the objects with which the user has interacted during the defined period of time. In this example, the defined period of time includes Day 1 120(1) and Day 2 120(2) and the objects include objects 122(1), 122(2) through 122(N), 124(1), and 124(2). As illustrated, the object 122(1) relates to the sport basketball, object 122(2) relates to the sport baseball, and object 122(N) relates to the sport football. In addition, the object embeddings corresponding to objects 124(1) and 124(2) both include attributes corresponding to a color of the items represented by the objects. In this example, the object 124(1) is an image of a red basketball jersey and the object 124(2) is an image of a red pair of gym shorts. Those attributes, sports and red, along with other object attributes, may be represented by the continuous data generated for the object embeddings of those objects.

When the continuous data of the object embeddings corresponding to objects with which the user has interacted during the defined period of time are combined with the continuous data generated for the user profile, a user embedding is produced that is representative of the combination and illustrative of a blend between the user's long-term behavior and short-term interest or inferred intent.

The continuous data of the user embedding may then be represented as a position within a multi-dimensional space. Likewise, continuous data of object embeddings corresponding to objects maintained by the management service 110 may also be represented as different positions in the multi-dimensional space. Distances between the position of the user embedding and each of the object embeddings within the multi-dimensional space may then be determined. The distances between the position of the user embedding and the positions of the object embeddings are representative of a similarity between the user embedding and the respective object embeddings. Object embeddings having a position in the multi-dimensional space that is closer to the position of the user embedding, and thus have a short distance, are more similar to the user embedding and will have a higher similarity score. As the distance between the position of the user embedding and positions of object embeddings increases, the similarity between the user embedding and the corresponding objects decreases and, as a result, corresponding objects have lower similarity scores.

In this example, in addition to determining similarity scores between the user embedding and object embeddings, the explicit input from the user (e.g., search term—"Shoes") may be compared with the objects to determine a ranking or relevance of the objects with respect to the explicit user input. For example, labels or keywords associated with objects may be queried to determine objects that include a label matching or similar to the request "shoes." Various forms of keyword searching may be utilized to determine objects having labels or keywords corresponding to shoes. For example, an exact match of "shoes" may be required. In other examples, objects associated with the category shoes and/or having labels associated with the category shoes or types of shoes may be determined to satisfy the user request for the search term "Shoes." In one example, objects having labels related to the search term "shoes" (e.g., high heel, hiking shoe, sandals, slippers, footwear, etc.) may be determined to correspond to the user input. In some implementations, the relevance or relationship between the user request and the labels of the objects may be ranked and/or scored, referred to herein as a request relevance score.

Finally, objects having a highest similarity score based on the distances between the user embedding and the object embeddings may be ranked and those objects matching or related to the explicit input of the user, as represented by the request relevance scores, may be selected as objects of potential interest to the user and corresponding to the explicit user input. The selected objects may then be returned and presented to the user on a display of the user device 104.

Through the use of keyword filtering of objects and ranking objects based on the similarity of an object embedding corresponding to the object with respect to a user embedding, the results presented to the user are both relevant to the user request and of higher potential interest to the user. In this example, the search results 128 returned in response to the user request of "Shoes" include shoes having a high correlation to both the long-term user behavior and the short-term interactions by the user with other objects. For example, rather than returning shoes of various types (e.g., high heel shoes, sandals, dress shoes, etc.), the returned search results 128, in this example, include shoes related to sports and further include shoes related to sports that are red in color. For example, the objects determined to have the highest potential interest to the user are red basketball shoes 130(1) and red cleats 130(2). Other examples of search results include hiking boots 130(3) and golf shoes 130(4).

While the above example, determines distances between the represented positions of a user embedding and represented positions object embeddings corresponding to objects maintained in the object data store 113 by the management service 110 and also determining a relevance of those objects with respect to an explicit user input, in other implementations, potential objects of interest may be determined differently. For example, the explicit user input (e.g., a search request) may first be used to identify objects maintained in the object data store 113 that relate to or correspond to the explicit user input. In this example, all objects that are related to or include labels related to shoes or a category of shoes may be determined. This determined group or set of objects may then be utilized by the management service to determine a similarity between the object embeddings of those objects and the user embedding generated for the user. In such an example, the number of objects considered for similarity with the user embedding may thus be reduced to only include those that relate to the explicit input from the user.

Likewise, as discussed further below, the described implementations may be used to determine objects of potential interest to a user without an explicit input (e.g., request) from the user. For example, FIG. 1B illustrates a user access of objects over a period of time and then a determination and presentation of objects that are likely to be of interest to the user, without the user submitting an explicit input, according to described implementations.

Similar to FIG. 1A, in this example, during a first period of time, such as a first day 120(1), a user may interact with, via the user device 104, object 122(1), 122(2), through 122(N) and the management service 110 maintains information about the user and the user's access of those objects during that first period of time. For example, the management service maintains in the user interaction data store 115, an indication of the objects interacted with by the user, such as objects 122(1), 122(2) through 122(N), the time period or time of the interaction, such as day 1 120(1), and/or other information about the interaction. As the user continues to interact with various content during the same or different times, the user interactions may be maintained by the management service 110 in the user interactions data store 115.

Figure 1B:
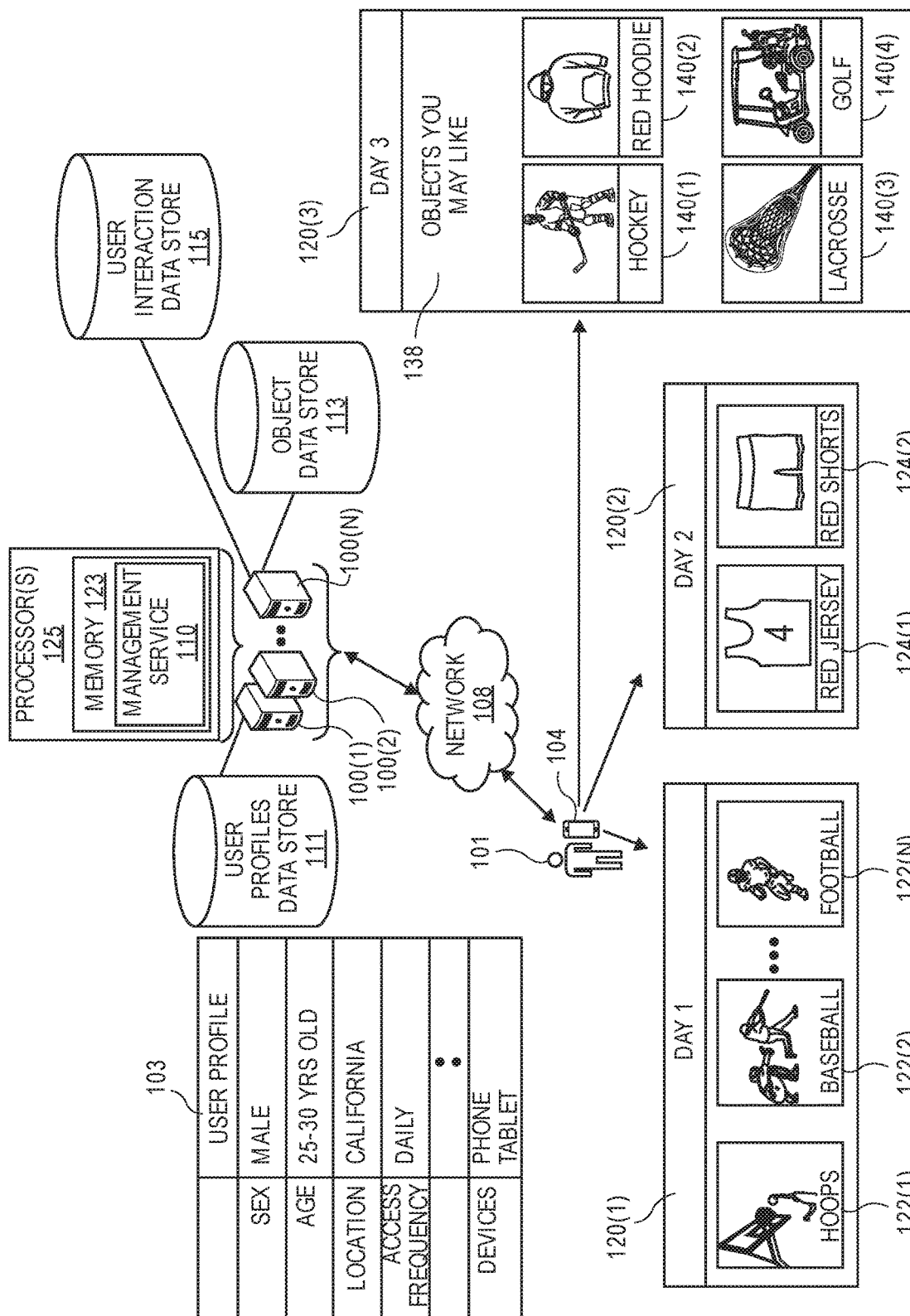
FIG. 1B illustrates an example of a user interacting with objects over a period of time and then a system determining and presenting objects of potential interest to the user, according to described implementations.

In the example illustrated in FIG. 1B, during a second period of time, Day 2 120(2), the user interacts with two objects 124(1) and 124(2) and the management service updates the user interaction data store 115 to reflect those interactions.

As the user continues to interact with objects, the management system updates the user interaction data store 115 and, as discussed further below, may utilize some or all of that information to determine or infer a short-term user interest or short-term user intent.

In contrast to the example discussed with respect to FIG. 1A, in this example, during a third period of time, Day 3 120(3), the user 101, via the user device 104, accesses the social network but does not submit an explicit input. The management service 110, upon receiving the access request from the user device, generates the user embedding for the user 101, as discussed herein, based on the user profile 103 and the objects with which the user has interacted during the defined period of time. In this example, the defined period of time includes Day 1 120(1) and Day 2 120(2) and the objects include objects 122(1), 122(2) through 122(N), 124(1), and 124(2). As illustrated, the object 122(1) relates to the sport basketball, object 122(2) relates to the sport baseball, and object 122(N) relates to the sport football. In addition, the object embeddings corresponding to objects 124(1) and 124(2) both include attributes corresponding to a color of the items represented by the objects. In this example, the object 124(1) is an image of a red basketball jersey and the object 124(2) is an image of a red pair of gym shorts. Those attributes, sports and red, may each be represented by the continuous data generated for the object embeddings of those objects.

When the continuous data of the object embeddings corresponding to objects with which the user has interacted during the defined period of time are combined with the continuous data generated for the user profile, a user embedding is produced that is representative of the combination and illustrative of a blend between the user's long-term behavior and short-term interest or inferred intent.

The continuous data of the user embedding may then be represented as a position within a multi-dimensional space. Likewise, continuous data of object embeddings corresponding to objects maintained by the management service 110 may also be represented as different positions in the multi-dimensional space. Distances between the position of the user embedding and each of the object embeddings within the multi-dimensional space may then be determined. The distances between the position of the user embedding and the positions of the object embeddings are representative of a similarity between the user embedding and the respective object embeddings. Object embeddings having a position in the multi-dimensional space that is closer to the position of the user embedding, and thus have a short distance, are more similar to the user embedding and will have a higher similarity score. As the distance between the position of the user embedding and positions of object embeddings increases, the similarity between the user embedding and the corresponding objects decreases and, as a result, corresponding objects have lower similarity scores.

The objects may then be ranked based on the determined similarity scores and highest ranked objects returned for presentation to the user via the user device as objects of potential interest 138 to the user. In this example, the management service determines that the objects 140(1), related to the sport hockey, the object 140(2), representative of a red hoodie, the object 140(3), representative of the sport lacrosse, and the object 140(4), representative of the sport golf, are the objects most likely to be of interest to the user. Specifically, based on the comparison of the user embedding generated for the user based on the user profile 103 and the objects 122(1), 122(2), through 122(N), 124(1), and 124(2) with which the user has interacted during the defined period of time, and each of the object embeddings representative of objects maintained in the object data store 113, the objects 140(1), 140(2), 140(3), and 140(4) are determined to be the most similar to the user embedding (i.e., have the shortest distances).

Figure 2:
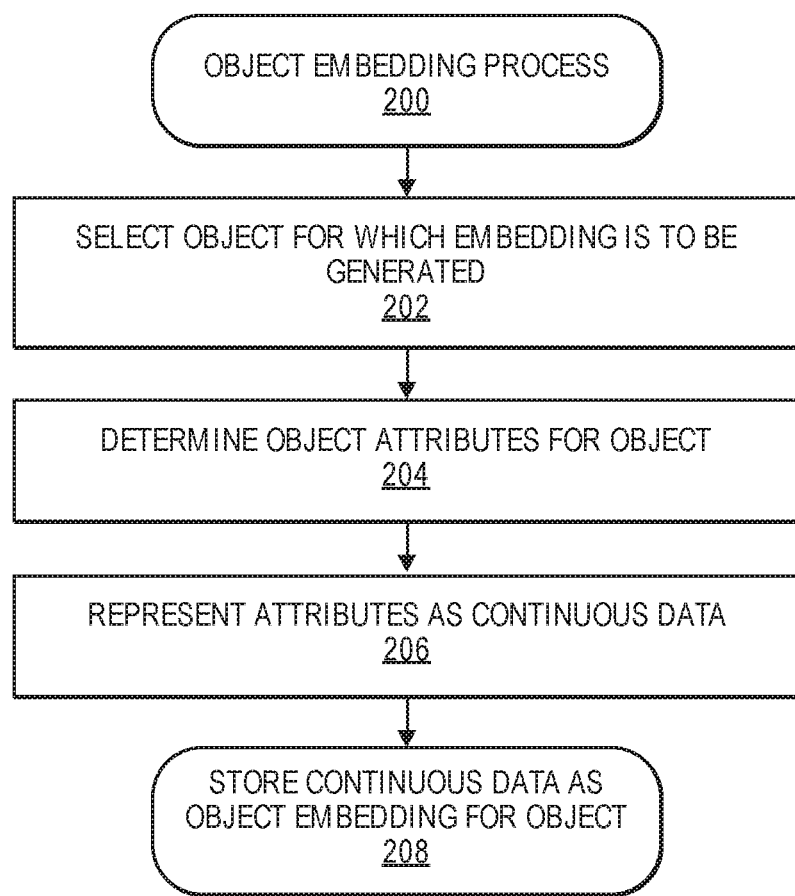
FIG. 2 is an example object embedding process, according to described implementations.

FIG. 2 is an example object embedding process 200, according to described implementations. The example process begins by selecting an object for which an embedding is to be performed, as in 202. The object may be an object that is stored in an object data store (referred to herein as a stored object). In other implementations, the object may be a user profile maintained in a user data store. In other examples, the object for which an object embedding is generated may be a collection of other objects, such as a collection or group of images. For example, a collection of objects may be a group of objects, such as images, selected by the user and associated as a collection of objects. Alternatively, the collection of objects may be objects corresponding to an explicit input, such as a search request. For example, as discussed further below, an explicit input may be considered an object and an object embedding generated for that explicit input. In such an example, the explicit input may be represented as a collection of objects that are responsive to the explicit input and/or that are frequently interacted with when returned and presented to users in response to an explicit input. In general, an object may be anything that can be represented by continuous data.

In some implementations, all stored objects, collections of objects, explicit inputs, and/or user profiles may be processed to generate object embeddings representative of the respective object. For example, as new objects are stored in the object data store they may be processed to generate an object embedding representative of the object. Likewise, because the object embeddings are continuous and change as attributes of objects change, the example process 200 may be periodically or continuously performed for objects. In other examples, the example process 200 may be performed "on demand," or prior to use of an object embedding with other aspects described herein. An embedding, such as an embedding representative of a collection of objects, an explicit input, a user profile, and/or other form of object, may be generally referred to herein as an object embedding or simply an embedding, unless specifically referenced otherwise.

As discussed, an object embedding includes continuous data, such as floating-point values, representative of different attributes about the object it represents. In some implementations, each embedding may include hundreds or thousands of floating point values. In other implementations, other forms of continuous data may be utilized to represent attributes of the object.

For a selected object, object attributes about the object are determined, as in 204. In some implementations, there may be a set number of object attributes that, if present for the object, are determined. In other implementations, one or more machine learning algorithms, such as convolutional neural networks like VGGNet, ResNet, Inception, Xception, word2vec, etc., may be utilized to classify the objects. As part of the processing, attributes about the objects that are used to classify those objects are produced. Object attributes include anything about the object such as, but not limited to, object category, colors, type of object, popularity of the object in a social network, user engagement, popularity of an object, age of the object, items represented in the object, etc. In some implementations, hundreds or thousands of attributes about an object may be determined.

Returning to FIG. 2, the attributes determined for an object may then be represented as continuous data, as in 206. For example, each attribute may be represented by one or more decimal floating-point numbers. In some implementations, the continuous data may be derived from the machine learning processing and indicative of the attributes of the processed objects. In other implementations, the continuous data representative of the attributes may be determined based on attributes generated for a set of objects utilizing one or more other machine learning approaches. Similar attributes will be represented with similar continuous data while attributes that are not similar will be represented with different continuous data.

Finally, the continuous data determined for the object is stored in an object embedding data store as an object embedding representative of the object, as in 208. In comparison to assigning an identifier for an object that is static or discrete, at least some of the continuous data representative of various attributes of an object may change over time. For example, the continuous data representative of the attributes of age of the object, popularity of the object, number of users interacting with the object, etc., may change as those attributes change. As discussed further below, the continuous data of an object embedding may be represented as a position in a multi-dimensional space with other object embeddings to determine objects that are considered similar based on the distances of the represented positions. Accordingly, as the object embedding changes, the position of the object within the multi-dimensional space with respect to other object positions may likewise change.

Figure 3:
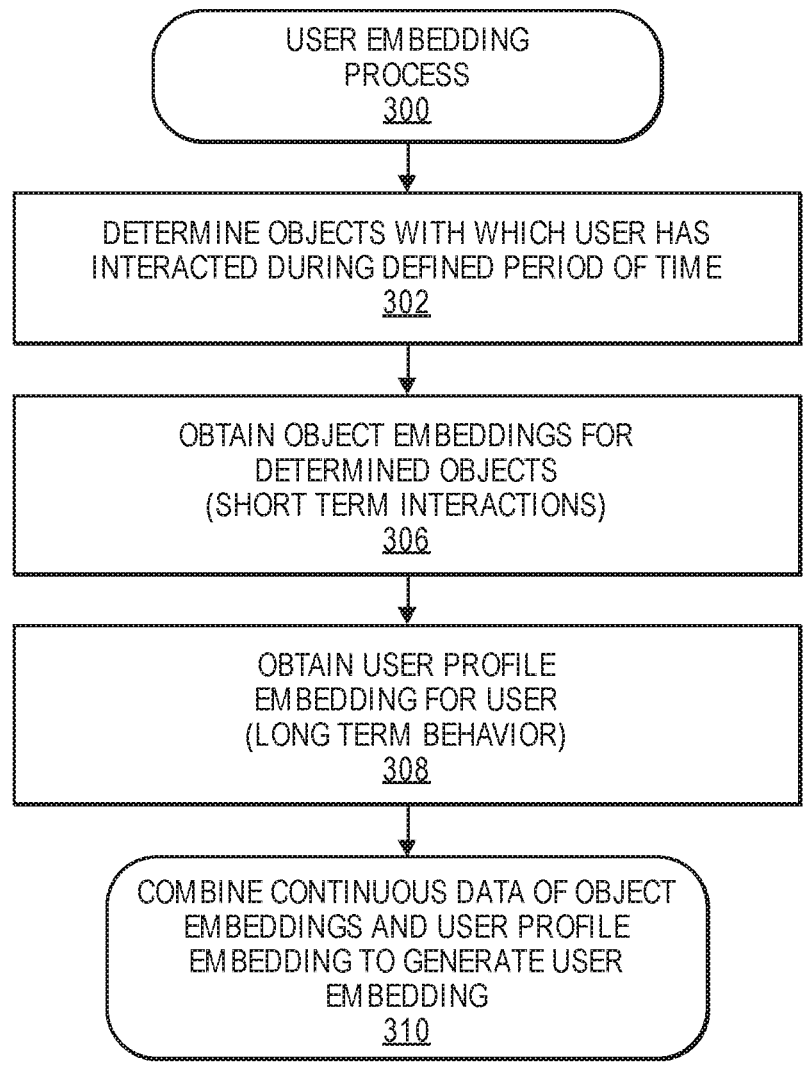
FIG. 3 is an example user embedding process, according to described implementations.

FIG. 3 is an example user embedding process 300, according to an implementation. As discussed, a user embedding is a blend that is representative of both the user's long-term behavior, as represented by the user profile, and object embeddings corresponding to objects with which the user has interacted during a defined period of time. The objects with which the user has interacted during a defined period of time provide information indicative of the user's current interests or intent. Likewise, the example process 300 may be performed periodically, reactively in response to requests from a user device, and/or upon detection of any change corresponding to the user. For example, if a user is interacting with a social network, accessing objects, posting objects, sharing objects, etc., attributes about the user may change in response to those user interactions. As such, the example process 300 may be performed upon detection of those changes so that the user embedding remains current and reflective of the user's current interests or activities.

The example process 300 begins by determining objects with which the user has interacted during a defined period of time, as in 302. The defined period of time may be any period of time that is of interest for determining the user's current interests or intent. For example, the defined period of time may be the past ten minutes, the past twenty-four hours, the past seven days, etc. In some implementations, the defined period of time may vary for different users, different access frequencies, different types of searches, etc.

For each determined object, corresponding object embeddings formed utilizing the example process discussed above with respect to FIG. 2 are obtained from an object embedding index, as in 306. The object embeddings corresponding to the determined objects are representative of the user's short-term interactions and may be used as representative of the interest or intent of the user.

In addition to obtaining object embeddings for objects with which the user has interacted, a user profile embedding representative of the user is obtained or generated, as in 308. As with other embeddings, the user profile embedding includes continuous data representative of attributes of the user. In this example, the user profile embedding is based on the user profile maintained for the user and is representative of the long-term behavior of the user.

Finally, the continuous data of the obtained object embeddings and the continuous data of the user profile embedding are combined to generate continuous data that is included in a user embedding that is representative of both the user's long-term behavior and the user's current interests or intent, as in 310. In some implementations, the continuous data of the object embeddings and the user profile embedding may be summed to form the continuous data included in the user embedding. In other implementations, different aspects of the different sets of continuous data may be selectively combined to form the continuous data of the user embedding. In still other examples, some portions of continuous data may be weighted more than other portions of continuous data.

While the example illustrated with respect to FIG. 3 describes a user embedding as representative of a blend between the user's long-term behavior, as represented by the user profile, and the user's inferred short-term interests, as represented by objects with which the user interacted with during a defined period of time, in other implementations, the user embedding may be weighted more heavily toward the short-term interests or more toward the long-term behavior. For example, the inferred short-term interests may be given a larger weight than the long-term behavior when determining the user embedding. In some implementations, the user's long-term interest may not be considered, and the user embedding may be representative of only the user's short-term interest.

In some implementations, a first user embedding representative of a blend of the user's long-term behavior and inferred short-term interest may initially be utilized and as the user interacts with presented objects, the user embedding may be updated to give a higher weight, or only consider, the inferred short-term interests of the user. In such an example, the short-term interests may be inferred based on the objects with which the user is currently interacting and/or objects with which the user is currently interacting and those with user has interacted with during the defined period of time. If the short-term interest is being inferred based on objects with which the user is currently interacting and objects the user has interacted with during the defined period of time, the objects with which the user is currently interacting may be given a higher weight when determining the user embedding.

Figure 4:
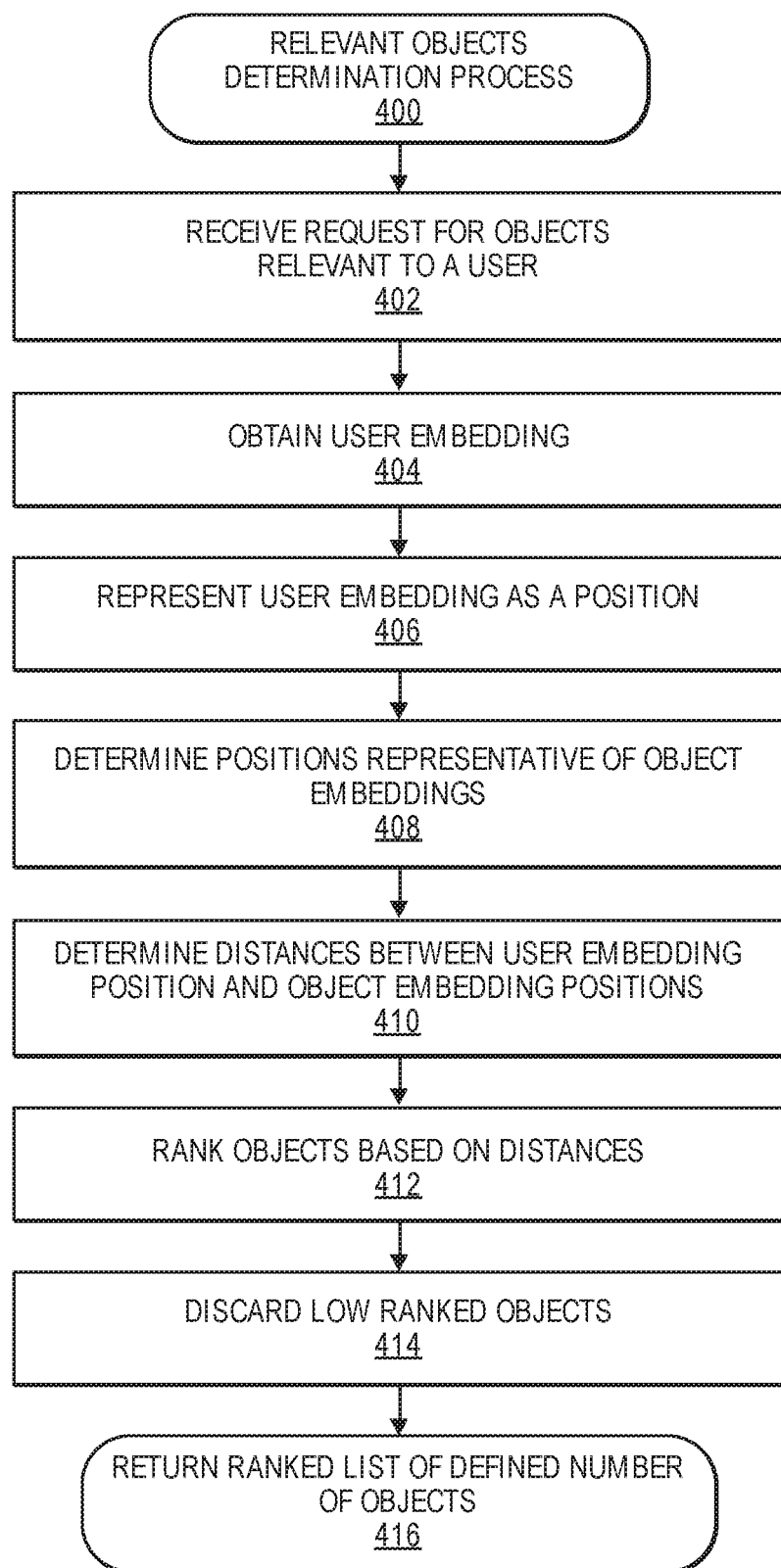
FIG. 4 is an example of relevant objects determination process, according to described implementations.

FIG. 4 is an example relevant objects determination process 400, according to described implementations. The example process 400 begins upon receipt of a request for objects that are potentially relevant to the user, as in 402. Such a request may be received any time objects are to be sent to a user device for presentation. For example, a request for objects may be initiated each time a user accesses an application on their user device through which objects are presented to the user.

Upon receipt of a request, the user embedding generated for the user according to the example process 300 discussed with respect to FIG. 3 is obtained or generated according to the example process 300 (FIG. 3), as in 404. The continuous data of the user embedding may then be utilized to represent the user embedding as a position in a multidimensional space, as in 406.

In addition to representing the user embedding as a position in a multi-dimensional space, positions for some or all of the stored object embeddings may be determined and represented in the multi-dimensional space, as in 408. As discussed above, because portions of the continuous data of the object embeddings and/or the user embedding may change, in some implementations, the positions of the user embedding and/or the object embeddings within the multi-dimensional space may be determined each time the example process 400 is performed. In other implementations, the positions of the object embeddings and/or the user embedding may be determined periodically and/or upon determination of a change of one or more aspects of the continuous data of the user embedding and/or an object embedding.

Based on the determined position of the user embedding and the positions of some or all of the stored object embeddings, distances between the position of user embedding and positions of stored object embeddings are determined, as in 410. For example, a distance between the position of the user embedding and the position of a first object embedding may be determined, the distance between the position of the user embedding and the position of a second object embedding may be determined, and the distance between the position of the user embedding and the position of a third object embedding may be determined. As will be appreciated, any number of distances between the position of the user embedding and any number of positions of objects embeddings may be determined.

The object embeddings and corresponding objects may then be ranked based on the determined distances, as in 412. In some implementations, the distances may be indicative of the similarity between the compared object embedding and the user embedding, with shorter distances indicating a higher similarity and longer distances indicating a lower similarity. In some implementations, a similarity score may be assigned based on the distances determined for each stored object embedding. In other implementations, the distances may be considered the similarity score, with shorter distances representative of a higher similarity score. In some implementations, objects corresponding to low similarity scores may be discarded from the ranked list, as in 414.

Finally, objects corresponding to object embeddings with the highest similarity scores or shortest distances to the user embedding are returned for presentation to the user via a display of the user device, as in 416. In some implementations, a defined number of objects may be returned. In other implementations, the number of objects returned may be limited to include only those having a corresponding similarity score that is above a defined threshold. In still another example, the number of highest ranking objects returned may be determined based on a user preference and/or based on the size and/or type of user device.

Figure 5:
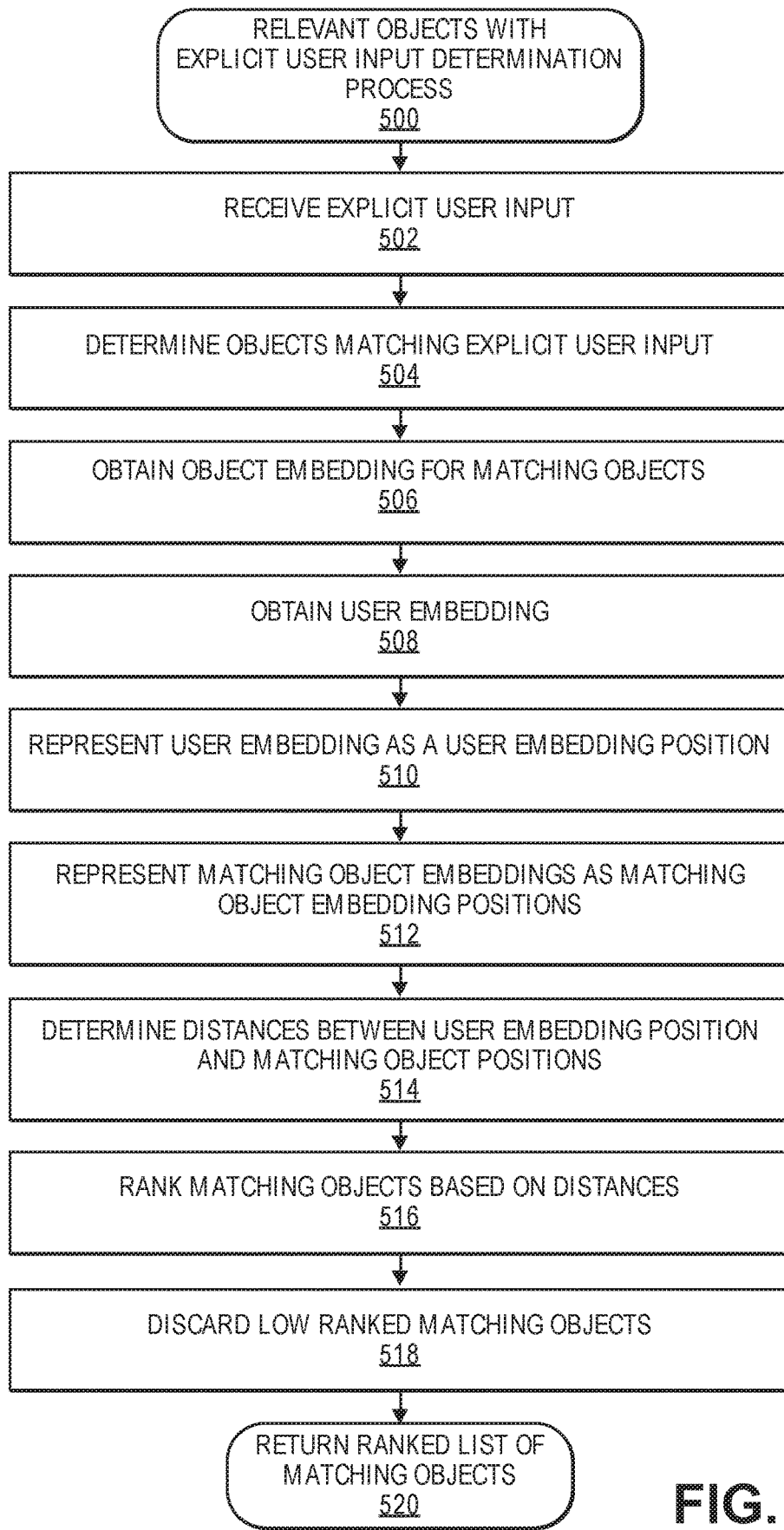
FIG. 5 is an example of relevant objects with explicit user input determination process, according to described implementations.

FIG. 5 is an example relevant objects with explicit user input determination process 500, according to described implementations. The example process 500 begins upon receipt of an explicit input, such as a text based search query or visual based query, as in 502. Upon receipt of an explicit user input, the object data store is processed to determine objects that match the explicit user input, as in 504. For example, if the user input is a keyword search request, the object data store may be queried to identify objects that include keywords matching the provided search query. As another example, if the explicit user input is a visual search request, such as the user submitting or selecting an image for which other visually similar images are to be returned, the object data store may be queried to identify objects that are visually similar to the provided or selected image.

For each matching object, the object embedding maintained in the object embedding data store is obtained and/or generated, for example using the example process 200 discussed above with respect to FIG. 2. In addition, the user embedding generated for the user according to the example process 300 discussed with respect to FIG. 3 is obtained or generated according to the example process 300 (FIG. 3), as in 508.

The continuous data of the user embedding may then be utilized to represent the user embedding as a position in a multidimensional space, as in 510. Likewise, positions for the matching object embeddings corresponding to the matching objects may be represented in the multi-dimensional space based on the continuous data of those matching object embeddings, as in 512. As discussed above, because portions of the continuous data of the object embeddings and/or the user embedding may change, in some implementations, the positions of the user embedding and/or the matching object embeddings within the multi-dimensional space may be determined each time the example process 500 is performed. In other implementations, the positions of the matching object embeddings and/or the user embedding may be determined periodically and/or upon determination of a change of one or more aspects of the continuous data of the user embedding and/or a matching object embedding.

Based on the determined position of the user embedding and the positions of matching object embeddings, distances between the position of the user embedding and positions of matching object embeddings are determined, as in 514. For example, a distance between the position of the user embedding and the position of a first matching object embedding may be determined, the distance between the position of the user embedding and the position of a second matching object embedding may be determined, and the distance between the position of the user embedding and the position of a third matching object embedding may be determined. As will be appreciated, any number of distances between the position of the user embedding and any number of positions of matching object embeddings may be determined.

The matching object embeddings and corresponding matching objects may then be ranked based on the determined distances, as in 516. As discussed above, in some implementations, the distances may be indicative of the similarity between the compared matching object embedding and the user embedding, with shorter distances indicating a higher similarity and longer distances indicating a lower similarity. In some implementations, a similarity score may be assigned based on the distances determined for each matching object embedding. In other implementations, the distances may be considered the similarity score, with shorter distances representative of a higher similarity score.

Objects corresponding to the matching object embeddings are than ranked based on the distances and/or similarity scores, as in 516, and objects corresponding to low similarity scores may be discarded from the ranked list, as in 518.

Finally, matching objects corresponding to matching object embeddings having the highest similarity scores or shortest distances to the user embedding are returned for presentation to the user via a display of the user device, as in 520. In some implementations, a defined number of matching objects may be returned. In other implementations, the number of matching objects returned may be limited to include only those having a corresponding similarity score that is above a defined threshold. In still another example, the number of highest ranking matching objects returned may be determined based on a user preference and/or based on the size and/or type of user device.

While the example 500 discussed with respect to FIG. 5 describes determining matching objects that match the explicit user input and then determining distances between those matching object embeddings and the user embedding, in other implementations, distances between the user embedding and stored object embeddings may be determined and the stored objects ranked based on the similarity of those stored objects with the user embedding. Those ranked objects may then be further ranked or filtered based on the similarity of those objects with the explicit user input.

In still other examples, some explicit user inputs may be represented as object embeddings. For example, if an explicit user input is frequently received from various users, the management service may determine to generate an explicit user input object embedding representative of the explicit user input. In such an example, when subsequent instances of the user input are received, the explicit user input object embedding may be represented as a position in the multidimensional space, distances between the position of the explicit user input object embedding and positions of object embeddings determined, and objects corresponding to objects that are close to the explicit user input may be returned as responsive to the explicit user input.

Figure 6:
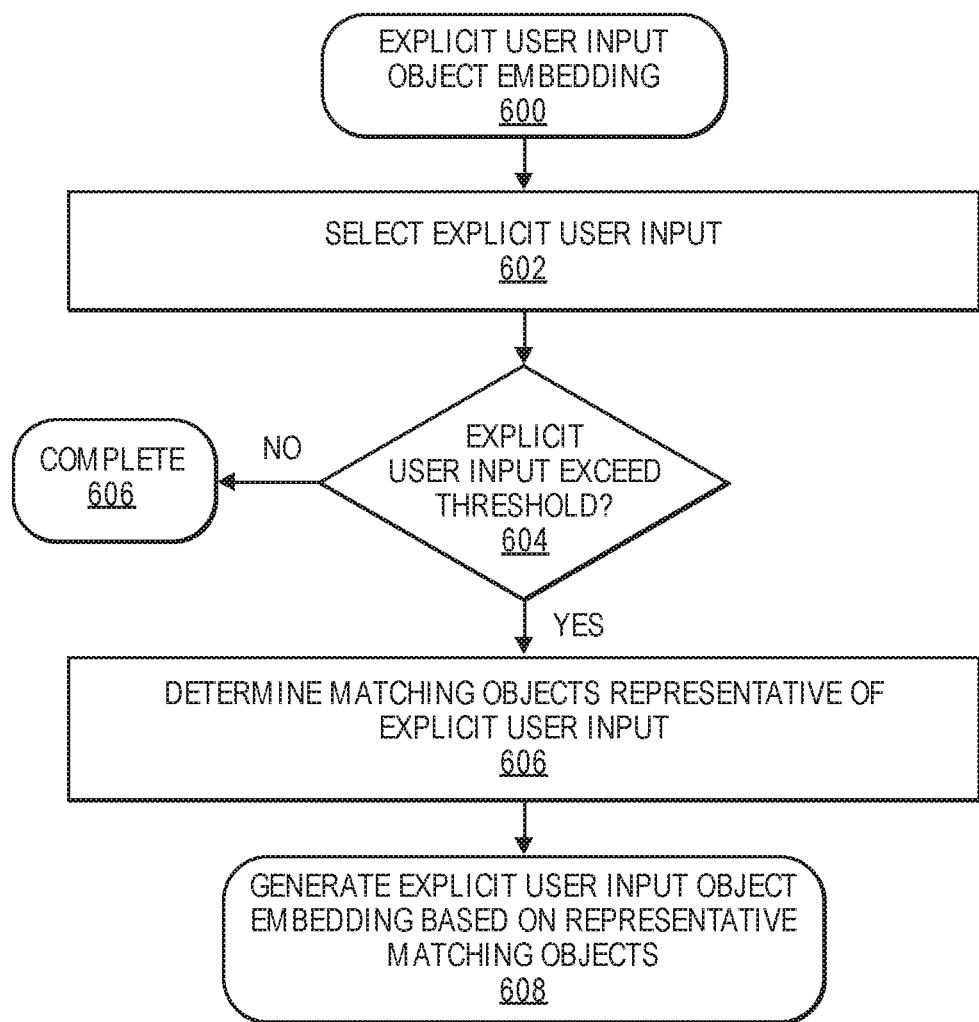
FIG. 6 is an example explicit user input object embedding process, according to described implementations.

FIG. 6 is an example explicit user input object embedding process 600, in accordance with described implementations. The example process 600 begins by selecting an explicit user input to consider for creating an explicit user input object embedding, as in 602. In some implementations, the example process may be performed each time an explicit user input is received. In other implementations, it may be performed at other times.

For a selected explicit user input, a determination is made as to whether the explicit user input has been received by users more than a threshold amount, as in 604. The threshold amount may be any value and may vary for different explicit user inputs. In some implementations, the threshold may be zero and every explicit user input may be processed and an explicit user input object embedding generated according to the example process 600.

If it is determined that the number of times the explicit user input has been received does not exceed the threshold, the example process completes, as in 606. However, if it is determined that the number of times the explicit user input has been received does exceed the threshold, matching objects representative of the explicit user input are determined as in 606. Matching objects representative of the explicit user input may be, for example, objects having a highest correlation or match with the explicit user input. In other implementations, matching objects representative of the explicit user input may be objects that are most frequently interacted with by users in response to the results of the explicit user inputs.

Utilizing matching objects representative of the explicit user input, an explicit user input object embedding is formed for the explicit user input, as in 608. For example, the continuous data of the object embeddings for the matching objects representative of the explicit user input may be combined to produce continuous data that is included in the explicit user input object embedding. The combination of the continuous data may be a sum of the continuous data, a weighted sum of the continuous data, etc.

When another user submits a subsequent explicit input corresponding to the generated explicit input embedding, the explicit input embedding may be utilized to identify objects responsive to the explicit, rather than or in addition to performing a search (e.g., keyword search) or other query based on the explicit input. As discussed, the explicit input embedding includes continuous data generated based on objects that have been selected by other users as responsive to the explicit input. Like other embeddings, the explicit input embedding may be represented as a position within a multi-dimensional space and compared with other objects represented in the multi-dimensional space to identify objects responsive to the explicit input. In addition, because the explicit input embedding includes continuous data, the continuous data may be updated each time the explicit input is provided by a user and presented objects interacted within by the user in response to the explicit input. For example, the continuous data of the explicit input embedding may be updated each time a user submits the explicit input and then selects or interacts with a particular object presented in response to that explicit input to reflect that object selection or interaction.

With the disclosed implementations, objects relevant to a user based on the user's long-term behavior (determined from a user profile known about the user), and based on the user's current interests (determined from objects with which the user has recently interacted), may be determined and presented to the user. Such information may be determined and provided without any explicit user input from the user. In other examples, a user may provide an explicit input, such as a search request, and the results matching the explicit user input may be ranked or filtered based on information known to the user and represented as the user embedding. In some implementations, a first user may utilize a user embedding associated with a second user to identify objects of potential interest to that user. For example, some users may agree to allow other users (e.g., social connections) to utilize their user information to discover objects of interest. In one example, two users, Bob and Sally, who are a couple, may agree to share information such that either user may explore and discover objects of potential interest to the other user. In such an example, Bob, knowing Sally's birthday is approaching, may request to view objects of potential interest to Sally to discover potential birthday gift ideas. In such an example, a user embedding for Sally will be generated and utilized to identify objects of potential interest to Sally, as discussed above. Those objects may then be returned and presented to Bob so that Bob can view objects of potential interest to Sally.

In some implementations, the continuous data of each of the object embeddings and the continuous data of the user embedding(s), and/or any other embeddings, may be processed using one or more locality-sensitive hashing ("LSH") techniques, such as a random projection method, to reduce the dimensionality of the multi-dimensional space without compromising the distance between positions of the embeddings. Utilizing LSH, the embeddings are hashed so that similar embeddings map to the same "buckets" with a high probability. The dimensionality reduction is the result of the number of buckets being much smaller than the number of possible embeddings. Once the embeddings are hashed into buckets, a query embedding, such as a user embedding, may be compared to other embeddings hashed into the same buckets to identify embeddings closest to the query embedding—such as, by using a nearest neighbor comparison. Because the number of embeddings in the same buckets is much smaller than the total number of embeddings, nearest neighbors can be identified in time sublinear in the number of embeddings. As such, by hashing a user embedding into buckets and finding other embeddings of those buckets having high similarity, objects corresponding to those embeddings may be determined and presented to the user as objects of potential interest to the user. This matching may be done with both reduced time and computing requirements.

In some implementations, an LSH search system may be implemented by assigning a unique identifier to each bucket and by treating each bucket as a search term. In such an example, each embedding is represented as a collection of search terms, and the task of computing nearest neighbors for a given query embedding is then reduced to searching an index of embedding search-terms based on a query of terms. This may be accomplished by mapping each term to a list (also referred to herein as a posting list) of embeddings that include the term and traversing lists targeted by the query, searching for embeddings with the largest number of matching terms.

While Random Projection LSH has a variety of uses, it may be applied to search for nearest neighbors of real-valued embeddings based on some form of angular distance (e.g., cosine similarity), with embeddings normalized and acting as points on a unit hypersphere. In the method, each Random Projection LSH function is represented by a random projection. Given an embedding, the output of the function is 0 if the dot-product between the projection and the embedding is less than or equal to 0 and 1 if it is greater than 0.

Geometrically, the output is 0 if the embedding is on one side of the hyperplane defined by the projection and 1 if it is on the other. That is, each projection defines a hyperplane that passes through the origin and splits the unit hypersphere with all the embedding points on its surface split into two groups: those on one side of the hyperplane and those on the other. Points in close proximity to each other are proportionally more likely to be on the same side the hyperplane.

Each function in the Random Projection method maps each embedding to one of two buckets "0" or "1" and therefore provides at most a single bit of information. With each projection vector generated randomly, the number of projections and therefore the number of bits that can be generated is practically unlimited. Moreover, if the dimensionality of the space is high, any two random projection vectors are guaranteed to be close to orthogonal to each other and therefore significantly different. For example, the dot product of two vectors may be approximately the same as a Pearson correlation coefficient for the vector coordinates. Because no correlation between random coordinates is expected, the dot product will approach 0.

With a practically unlimited number of random projections to choose from, each embedding can be mapped to a sequence of bits, one bit per projection, with the value of the angle between any two embeddings shown to be proportional to the normalized Hamming distance between their LSH bit sequences. In such a configuration, the problem of finding nearest neighbors based on angular distance can be reduced to the problem of finding nearest neighbors in the Hamming space. By searching for embeddings with the largest number of matching LSH bits, it is then possible to identify embeddings closest to the query embedding.

While it is possible to treat each bit as a separate search term, having terms of one bit each would result in a very "wide" index, with the length of each posting list linear in the total number of documents. With so many documents to explore in each list, the total computational requirements and time to complete an embedding query would also be linear in in the total number of documents and therefore prohibitively expensive. In order to address the problem, bits may be combined into longer terms of several bits each. With N bits per term, assuming each bit is equally likely to be "0" or "1," the number of possible bucket identifiers increases as $2^N$ for each multi-bit term function, making the average number of documents in each posting list reduce proportionally. With a well-chosen combination of the number of bits per term and the number of terms, an LSH search system can provide sub-linear performance.

The Random Projection method is a simple and powerful solution. For all its beauty, however, the method and its many implementations, including the generic-search implementation, described above, have drawbacks. With embeddings evenly distributed and each bit equally likely to be "0" or "1," each term value is also equally likely, leading to a set of balanced buckets and lists. In practice, however, it is rare for embeddings to be distributed evenly, with certain LSH bits more likely to be "0"-s than "1"-s or vice versa. With this mismatch effect multiplied many times over by combining individual bits into terms, some term values become much more likely than others, with buckets and lists unbalanced, often dramatically so.

With embeddings distributed unevenly, the cost of operating a naive implementation of the Random Projection method can be almost arbitrarily high. To resolve these deficiencies, as described herein, the LSH may be further optimized such that the number of embeddings hashed into each bucket remains balanced (i.e., each bucket has approximately the same number of embeddings). By keeping the number of items in each bucket balanced, the computations cost to process any one bucket to identify objects of potential interest remains approximately the same. In such examples, continuous data of an embedding may be converted into a binary representation. As part of that conversion, the projection vectors may be selected, and the corresponding conversion of the continuous data may be performed in such a manner as to balance the number of embeddings associated with each bucket.

Figure 7:
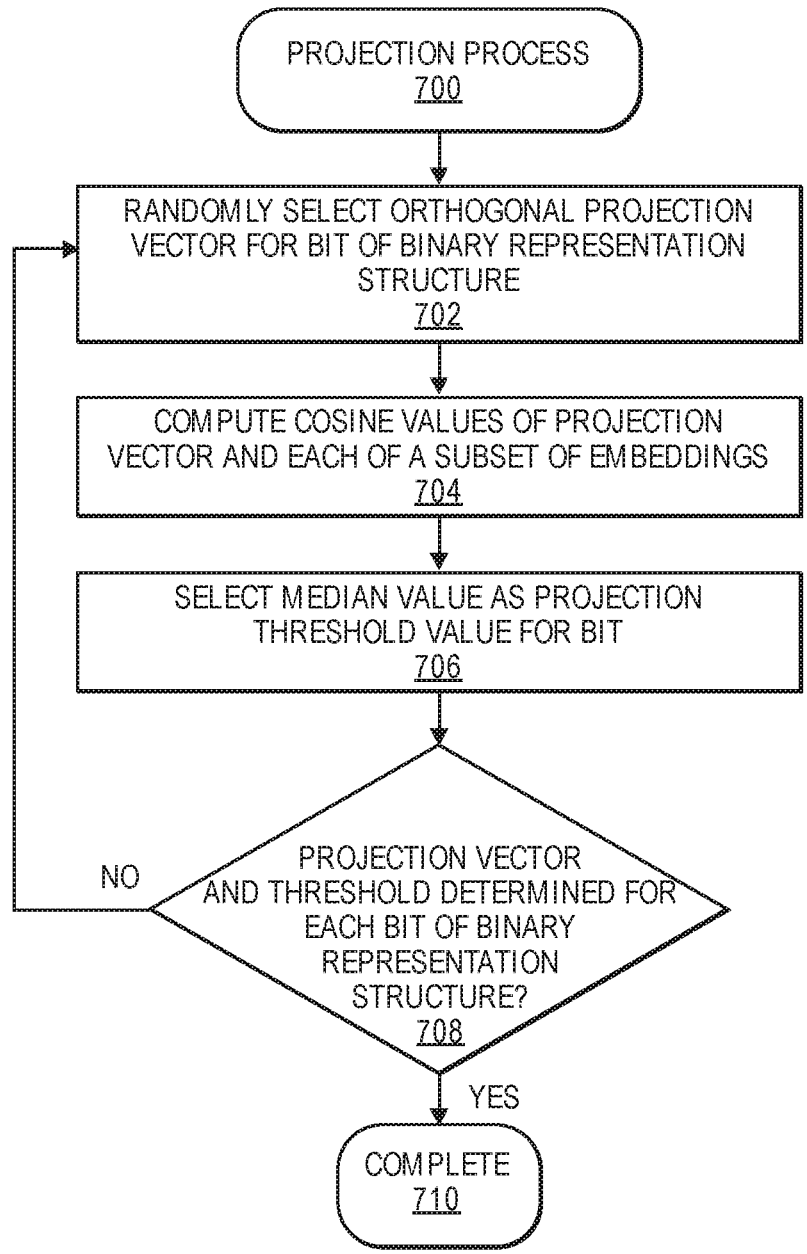
FIG. 7 is an example projection process, according to described implementations.

For example, FIG. 7 is an example projection process 700 for establishing buckets for each bit of a binary representation that is utilized to represent an embedding, according to described implementations. The example process 700 begins by randomly selecting an orthogonal projection vector for a bit of the binary representation structure, as in 702. In the example process, the initial projection vector may be selected as any projection vector. Additionally, while the illustrated example describes selection of orthogonal projection vectors for each bit of the binary representation structure, in other implementations, the selected projection vectors need not be orthogonal.

A binary representation structure may be a set of bits that are used to convert the continuous data of an embedding to a binary representation. The binary representation structure may have any number of bits and each bit may be independently assigned a projection vector and corresponding projection threshold value.

For a first bit, the projection vector may just be randomly selected. For each additional bit of the binary representation structure, the projection vectors may be randomly selected with the constraint that the projection vector be orthogonal to other selected projection vectors.

Upon selection of a projection vector, a distribution of cosine values between the projection vector and embeddings in the multi-dimensional space are computed, as in 704. As discussed above, the embeddings may be any form of embeddings included in a set of embeddings. In significantly large sets of embeddings, a subset or representative sample of the set of embeddings may be selected and combined with the selected projection vector to compute a distribution of cosine values. Selecting a subset or sampling reduces the computational cost of the projection process 700.

Based on the cosine values, a median-center of the distribution and its cosine value is determined and selected as the projection threshold value for the bit, as in 706. By selecting the median value as the projection threshold value, for any embedding, the bit can be assigned a value of 0 if the cosine of the angle between the embedding and the projection vector is less than or equal to projection threshold value and a value of 1 if the angle is greater than the projection threshold value. As a result, the quantity of embeddings assigned to each bucket for that bit will be balanced.

Upon determining a projection threshold value for the bit, a determination is made as to whether a projection vector and corresponding projection threshold value has been determined for each bit of the binary representation structure that will be used to generate a binary representation that is indexed for each embedding of the set of embeddings, as in 708. If it is determined that a projection vector and threshold have not been determined for each bit, the example process returns to block 702, selects an orthogonal projection vector for the next bit and continues. If it is determined that a projection vector and corresponding projection threshold value have been computed for each bit of the binary representation structure, the example process completes, as in 710.

Figure 8:
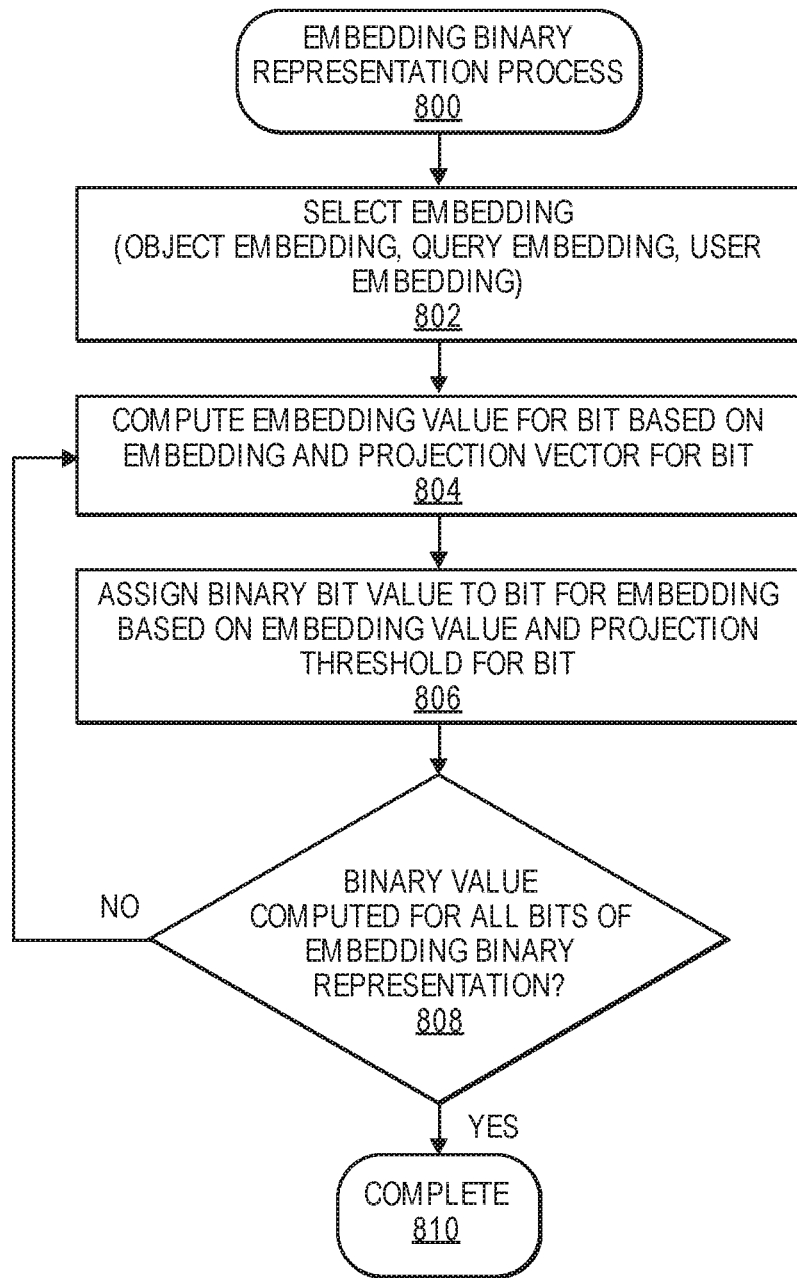
FIG. 8 is an example embedding binary representation process, according to described implementations.

FIG. 8 is an example embedding binary representation process 800, according to described implementations. The example process may be performed for any embedding of a set of embeddings to convert the embedding into a binary representation. The example process 800 begins by selecting an embedding to represent as a binary representation, as in 802. As discussed above, the embedding may be any form of information, including, but not limited to, images, groups of images, user profiles, queries, etc.

Utilizing the projection vectors randomly selected for the bits of the binary representation structure, as discussed above with respect to FIG. 7, an embedding value is computed for a bit of the binary representation as a cosine value of the projection vector associated with that bit and the continuous value of the embedding, as in 804. Based on the embedding value, a binary bit value is assigned to the bit for that embedding based on whether the computed embedding value is above or below the projection threshold value computed for that bit (FIG. 7), as in 806. For example, if the embedding value exceeds the projection threshold value for that bit, the bit may be assigned a binary value of one (1). If the embedding value is does not exceed the projection threshold value for that bit, the bit may be assigned a binary value of zero (0).

As discussed above, because the projection threshold value for the bit is set at a median value for the set of embeddings of the multi-dimensional object space, approximately half of the embeddings will be assigned a value of one and approximately half of the embeddings will be assigned a value of zero, thereby balancing the distribution of the embeddings between the two buckets A determination may then be made as to whether a binary value has been computed for each bit of the binary representation for the selected embedding, as in 808. If it is determined that a binary value has not been computed for each bit, the example process 800 returns to block 804 and continues for the next bit of the binary representation. If it is determined that a binary value has been computed for all bits of the binary representation, the example process 800 completes, as in 810.

FIG. 9 is a block diagram of a sample index of binary representations of embeddings, according to described implementations. As illustrated, a binary representation structure 900, indicating projection vectors and thresholds for each bit of a binary representation may be generated according to the example process 700 discussed above with respect to FIG. 7. In this example, every embedding of the set may be represented by eight bits 902-1, 902-2, 902-3, 902-4, 902-5, 902-6, 902-7, and 902-8. For each bit, a projection vector may be randomly selected that is orthogonal to other projection vectors randomly selected for other bits of the binary representation structure 900. For example, bit one 902-1 is associated with projection vector $P_1$, which may be randomly selected. Bit two 902-2 is associated with projection vector $P_2$, which may be randomly selected and orthogonal to projection vector $P_1$. Bit three 902-3 is associated with projection vector $P_3$, which may be randomly selected and orthogonal to projection vectors $P_1$ and $P_2$. Bit four 902-4 is associated with projection vector $P_4$, which may be randomly selected and orthogonal to projection vectors $P_1$, $P_2$, and $P_3$. Bit five 902-5 is associated with projection vector $P_5$, which may be randomly selected and orthogonal to projection vectors $P_1$, $P_2$, $P_3$, and $P_4$. Bit six 902-6 is associated with projection vector $P_6$, which may be randomly selected and orthogonal to projection vectors $P_1$, $P_2$, $P_3$, $P_4$, and $P_5$. Bit seven 902-7 is associated with projection vector $P_7$, which may be randomly selected and orthogonal to projection vectors $P_1$, $P_2$, $P_3$, $P_4$, $P_5$, and $P_6$. Bit eight 902-8 is associated with projection vector $P_8$, which may be randomly selected and orthogonal to projection vectors $P_1$, $P_2$, $P_3$, $P_4$, $P_5$, $P_6$, and $P_7$.

Likewise, for each bit 902, a threshold (th) may be determined as discussed above with respect to FIG. 7 that is set at the median value of the cosine values between embeddings of the set and the projection vector for the respective bit. For example, bit one 902-1 is associated with threshold $th_1$, which is the median value of the cosine values between embeddings of the set (or a sampling of embeddings of the set) and the projection vector $P_1$. Bit two 902-2 is associated with threshold $th_2$, which is the median value of the cosine values between embeddings of the set (or a sampling of embeddings of the set) and the projection vector $P_2$. Bit three 902-3 is associated with threshold $th_3$, which is the median value of the cosine values between embeddings of the set (or a sampling of embeddings of the set) and the projection vector $P_3$. Bit four 902-4 is associated with threshold $th_4$, which is the median value of the cosine values between embeddings of the set (or a sampling of embeddings of the set) and the projection vector $P_4$. Bit five 902-5 is associated with threshold $th_5$, which is the median value of the cosine values between embeddings of the set (or a sampling of embeddings of the set) and the projection vector $P_5$. Bit six 902-6 is associated with threshold $th_6$, which is the median value of the cosine values between embeddings of the set (or a sampling of embeddings of the set) and the projection vector $P_6$. Bit seven 902-7 is associated with threshold $th_7$, which is the median value of the cosine values between embeddings of the set (or a sampling of embeddings of the set) and the projection vector $P_7$. Bit eight 902-8 is associated with threshold $th_8$, which is the median value of the cosine values between embeddings of the set (or a sampling of embeddings of the set) and the projection vector $P_8$.

Utilizing the binary representation structure 900, each embedding such as OE1, OE2, OE3 through OEN may be converted from continuous data, as discussed above, to a binary representation 904 and indexed in a data store. For example, referring first to object embedding OE1, for the first bit 912-1, a cosine value of the angle between the continuous data of object embedding OE and the projection vector $P_1$ may be computed and a binary value assigned based on whether that cosine value is greater than or less than the projection threshold value $th_1$. In this example, it is determined that the cosine value is greater than the projection threshold value $th_1$ and a binary representation of one (1) is assigned to the first bit 912-1 for embedding OE1. For the second bit 912-2, the cosine value of the angle between the continuous data of object embedding OE and the projection vector $P_2$ may be computed and a binary value assigned based on whether that cosine value is greater than or less than the projection threshold value $th_2$. In this example, it is determined that the cosine value is greater than the projection threshold value $th_2$ and a binary representation of one (1) is assigned to the second bit 912-2 for embedding OE1. For the third bit 912-3, the cosine value of the angle between the continuous data of object embedding OE and the projection vector $P_3$ may be computed and a binary value assigned based on whether that cosine value is greater than or less than the projection threshold value $th_3$. In this example, it is determined that the cosine value is less than the projection threshold value $th_3$ and a binary representation of zero (0) is assigned to the third bit 912-3 for embedding OE1. For the fourth bit 912-4, the cosine value of the angle between the continuous data of object embedding OE and the projection vector $P_4$ may be computed and a binary value assigned based on whether that cosine value is greater than or less than the projection threshold value $th_4$. In this example, it is determined that the cosine value is greater than the projection threshold value $th_4$ and a binary representation of one (1) is assigned to the fourth bit 912-4 for embedding OE1. For the fifth bit 912-5, the cosine value of the angle between the continuous data of object embedding OE and the projection vector $P_5$ may be computed and a binary value assigned based on whether that cosine value is greater than or less than the projection threshold value $th_5$. In this example, it is determined that the cosine value is less than the projection threshold value $th_5$ and a binary representation of zero (0) is assigned to the fifth bit 912-5 for embedding OE1. For the sixth bit 912-6, the cosine value of the angle between the continuous data of object embedding OE1 and the projection vector $P_6$ may be computed and a binary value assigned based on whether that cosine value is greater than or less than the projection threshold value $th_6$. In this example, it is determined that the cosine value is greater than the projection threshold value $th_6$ and a binary representation of one (1) is assigned to the sixth bit 912-6 for embedding OE1. For the seventh bit 912-7, the cosine value of the angle between the continuous data of object embedding OE1 and the projection vector $P_7$ may be computed and a binary value assigned based on whether that cosine value is greater than or less than the projection threshold value $th_7$. In this example, it is determined that the cosine value is greater than the projection threshold value $th_7$ and a binary representation of one (1) is assigned to the seventh bit 912-7 for embedding OE1. For the eighth bit 912-8, the cosine value of the angle between the continuous data of object embedding OE and the projection vector $P_8$ may be computed and a binary value assigned based on whether that cosine value is greater than or less than the projection threshold value $th_8$. In this example, it is determined that the cosine value is greater than the projection threshold value $th_8$ and a binary representation of one (1) is assigned to the eighth bit 912-8 for embedding OE1. After a binary value is assigned to each bit, as discussed, the binary representation for OE may be indexed and stored.

The process described for embedding OE may be performed for each embedding of a set of embeddings of a multi-dimensional space, such as OE1, OE2, OE3 through OEN, such that a binary value may be assigned to each bit and representative of that embedding for that bit. Similar to the assignment of binary values discussed above with respect to OE1, the projection vectors and projection threshold values determined for each bit of the binary representation structure 900 may be utilized to assign binary values to each of the other embeddings of the set of embeddings.

In this example, embedding OE2 may be represented as binary representation 904-2 in which the first bit 922-1 is assigned a value of one (1), the second bit 922-2 is assigned a value of one (1), the third bit 922-3 is assigned a value of one (1), the fourth bit is assigned a value of zero (0), the fifth bit is assigned a value of zero (0), the sixth bit 922-6 is assigned a value of zero (0), the seventh bit 922-7 is assigned a value of zero (0), and the eighth bit 922-8 is assigned a value of zero.

In a similar manner, embedding OE3 may be represented as a binary representation 904-3 in which the first bit 932-1 is assigned a value of zero (0), the second bit 932-2 is assigned a value of one (1), the third bit 932-3 is assigned a value of zero (0), the fourth bit 932-4 is assigned a value of one (1), the fifth bit 932-5 is assigned a value of zero (0), the sixth bit 932-6 is assigned a value of one (1), the seventh bit 932-7 is assigned a value of zero (0), and the eight bit 932-8 is assigned a value of zero (0).

The process of converting continuous data to binary representations that are indexed may be performed for each embedding of a set and/or each embedding added to a set. Likewise, while the described example illustrates eight bits, any number of bits may be included in the binary representation structure and corresponding binary representations. Likewise, because each bit is independently computed, additional bits may be added to a binary representation and computed independent of other bits of the binary representation.

While the above example process describes balancing buckets per bit, in some implementations, multiple bits may be assigned to each term and the described implementations may be utilized to balance every possible bit (prefix) of a term and every embedding within that term prefix. In such an example, the median cosine value for every possible prefix of each term may be computed and utilized as the projection threshold value(s) for that prefix.

For each term of N bits, all of the possible binary prefixes of the term can be organized into a binary tree, with the root node used to represent the empty prefix and every inner or leaf node in the tree used to represent a particular term prefix as defined by the path of "0"-s and "1"-s from the root node to the inner or leaf node in question. Then, for the root node, a cosine median value may be computed based on the set of embeddings in the index and utilized as the projection threshold value for that term bit such that the embeddings are evenly divided into two sets: those with the first term bit of "0" and those with the first term bit of "1." Using recursion, for each following term bit, projection threshold values ($th_0$) may be computed as the median cosine values for embeddings with the first term bit of "0" and projection threshold values ($th_1$) as the median cosine value for embeddings with the first term bit of "1" and those threshold values may be stored in the tree as part of "0"-prefix and "1"-prefix nodes respectively. This may be done for each bit of the term.

Because each term prefix at any depth is equally likely as any other prefix at the same depth in the tree, once the depth of the tree reaches the predefined limit, all the values at the leaf level are equally likely. Translation of an embedding into terms may then be done by walking the tree from the root down, computing the cosine value with a different projection vector at each level, one projection per level, comparing the cosine value against the projection threshold value for each prefix, appending "0" or "1", and recursing to the left or to the right subtree respectively until you reach the bottom of the tree or the predefined depth.

Figure 10:
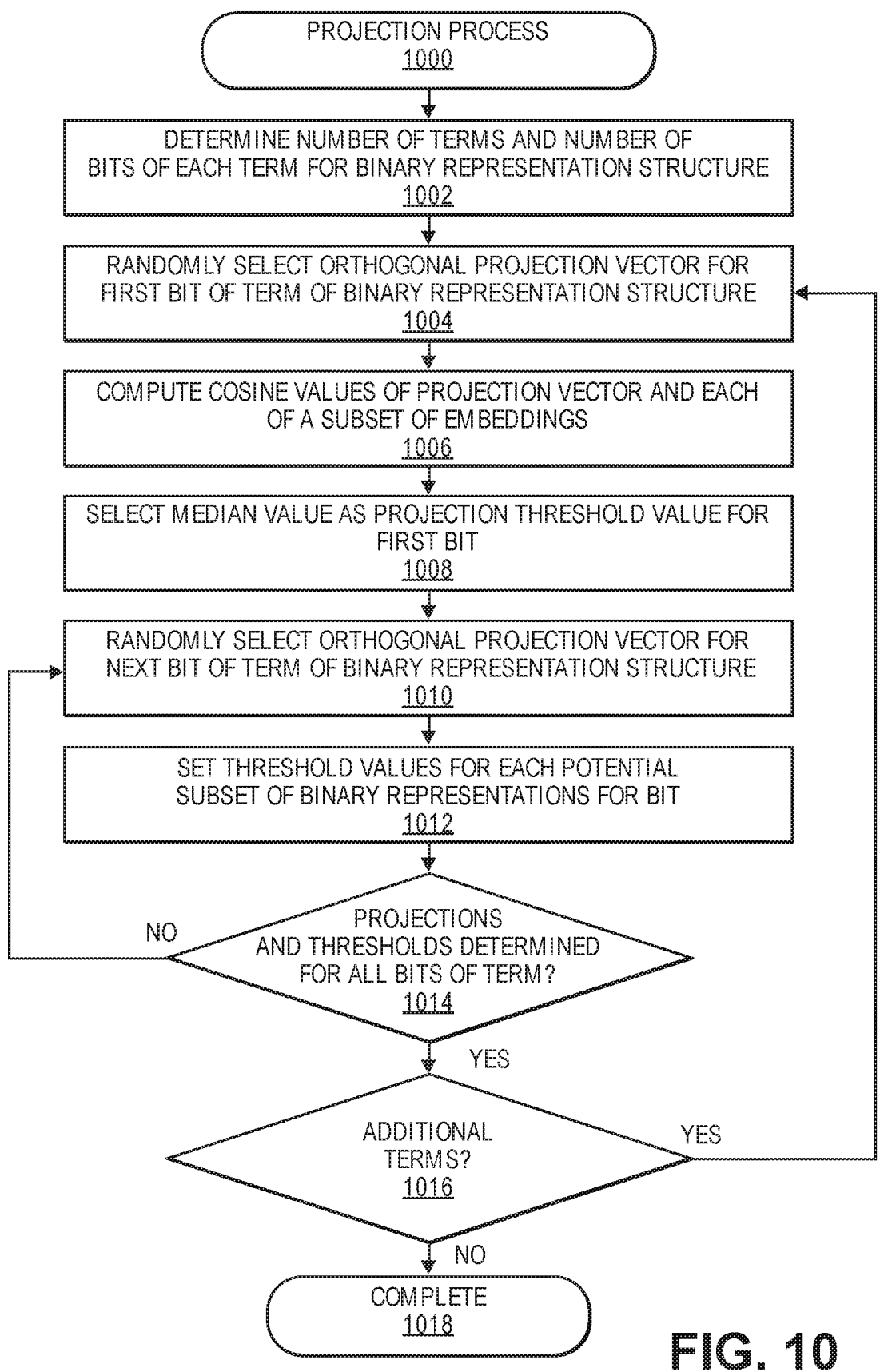
FIG. 10 is another example projection process, according to described implementations.

FIG. 10 is another example projection process 1000 for establishing buckets for each bit of a binary representation that is utilized to represent an embedding, according to described implementations. In comparison to the projection process 700, discussed above with respect to FIG. 7, in the example projection process 1000 the binary representation structure is segmented into terms, with each term including one or more bits.

Optionally, the example process 1000 may begin by determining the number of terms and the number of bits of each term that make up the binary representation structure, as in 1002. Any number of terms and any number of bits may be utilized. For example, each term may only include two bits. In other implementations, each term may include four bits, eight bits, etc. In some implementations, terms of a binary representation structure may have different quantities of bits. Likewise, any number of terms may be included in a binary representation structure. In some implementations, only a single term with two or more bits may constitute the binary representation structure. In other implementations, three, four, or hundreds of terms with any number and combination of bits may be included in the binary representation structure.

While the example illustrated with respect to FIG. 10 describes determining the number of terms and the number of bits in advance, implementations are equally applicable in which the number of terms and the number of bits are not determined in advance. For example, if the number of bits per term is not known in advance, a large enough number of random projection vectors may be generated in a particular order and a separate tree of fixed depth (F) established for each projection based on the projection itself and the next F−1 projections that follow.

For a first bit of a term, a projection vector may be randomly selected, as in 1004. In some implementations, the projection vector may be randomly selected with the constraint that it be orthogonal to other projection vectors of the binary representation structure. In other implementations, the projection vector need only be orthogonal to projection vectors of other bits in the same term. In still other examples, the projection vectors need not be orthogonal.

Upon selection of a projection vector, a distribution of cosine values between the projection vector and the embeddings in the multi-dimensional space is computed, as in 1006. As discussed above, the embeddings may be any form of embeddings included in a set of embeddings. In significantly large sets of embeddings, a subset or representative sample of the set of embeddings may be selected and combined with the selected projection vector to compute a distribution of cosine values. Selecting a subset or sampling reduces the computational cost of the projection process 1000.

Based on the computed cosine values, a median-center of the distribution and its cosine value are determined and the cosine is selected as the projection threshold value for the bit, as in 1008. By selecting the median value as the projection threshold value, for any projection, the bit can be assigned a value of 0 if the cosine of the angle between the embedding and the projection vector is less than or equal to the projection threshold value and a value of 1 if greater than the projection threshold value. As a result, quantity of embeddings assigned to each bucket for that bit will be balanced.

After determining the projection threshold value for the first bit of the term, an orthogonal projection vector is selected for the next bit of the term, as in 1010. As noted above, the projection vector for the next bit may be randomly selected with the constraint that it be orthogonal to other projection vectors of bits of the term. In other implementations, the projection vector may be orthogonal to all projection vectors of the binary representation structure. In still other implementations, orthogonality may be optional.

In comparison to the first bit value of a term, subsequent bit values may have multiple projection threshold values, one for each potential combination of embedding values for the prior bits of the term, or $2^{N-1}$, where N is the bit position within the term, as in 1012. For example, the first bit (N=1) will have one projection threshold value, the second bit (N=2) will have two projection threshold values, the third bit (N=3) will have four projection threshold values, etc. Each projection threshold value may be determined using recursion from the set of embeddings having a specific combination of values from the prior bits of the term. For example, referring to FIG. 12, Term 1 1201-1 of the binary representation structure 1200 includes randomly selected but orthogonal projection vectors $P_1$, $P_2$, $P_3$, and $P_4$. For the first bit 1202-1 of the first term 1201-1, a projection threshold value $th_1$ is determined as the median cosine value of the projection vector $P_1$ and the embeddings of the multi-dimensional space, as discussed above. For the second bit 1202-2 of the first term 1201-1, a first projection threshold value $th_{2-1}$ is computed as the median cosine value between the projection vector $P_2$ and the embeddings that were assigned a bit value of one in the prior bit 1201-1. Likewise, a second projection threshold value $th_{2-2}$ is also computed for the second bit 1202-2 of the first term 1201-1 as the median cosine value between the projection vector $P_2$ and the embeddings that were assigned a bit value of zero in the prior bit 1201-1.

Continuing, the third bit 1202-3 of the first term 1201-1 is associated with the third projection vector $P_3$ and four projection threshold values are computed for the third bit 1202-3. The first projection threshold value $th_{3-1}$ is computed as the median cosine value between the third projection vector $P_3$ and each of the embeddings that are assigned a bit value of one in the first bit 1202-1 and a bit value of one in the second bit 1202-2. The second projection threshold value $th_{3-2}$ is computed as the median cosine value between the third projection vector $P_3$ and each of the embeddings that are assigned a bit value of one in the first bit 1202-1 and a bit value of zero in the second bit 1202-2. The third projection threshold value $th_{3-3}$ is computed as the median cosine value between the third projection vector $P_3$ and each of the embeddings that are assigned a bit value of zero in the first bit 1202-1 and a bit value of one in the second bit 1202-2. The fourth projection threshold value $th_{3-4}$ is computed as the median cosine value between the third projection vector $P_3$ and each of the embeddings that are assigned a bit value of zero in the first bit 1202-1 and a bit value of zero in the second bit 1202-2.

The fourth bit 1202-4 of the first term 1201-1 is associated with the fourth projection vector $P_4$ and eight projection threshold values are computed for the fourth bit 1202-4. The first projection threshold value $th_{4-1}$ is computed as the median cosine value between the fourth projection vector $P_4$ and each of the embeddings that are assigned a bit value of one in the first bit 1202-1, a bit value of one in the second bit 1202-2, and a bit value of one in the third bit 1202-3. The second projection threshold value $th_{4-2}$ is computed as the median cosine value between the fourth projection vector $P_4$ and each of the embeddings that are assigned a bit value of one in the first bit 1202-1, a bit value of one in the second bit 1202-2, and a bit value of zero in the third bit 1202-3. The third projection threshold value $th_{4-3}$ is computed as the median cosine value between the fourth projection vector $P_4$ and each of the embeddings that are assigned a bit value of one in the first bit 1202-1, a bit value of zero in the second bit 1202-2, and a bit value of one in the third bit 1202-3. The fourth projection threshold value $th_{4-4}$ is computed as the median cosine value between the fourth projection vector $P_4$ and each of the embeddings that are assigned a bit value of one in the first bit 1202-1, a bit value of zero in the second bit 1202-2, and a bit value of zero in the third bit 1202-3. The fifth projection threshold value $th_{4-5}$ is computed as the median cosine value between the fourth projection vector $P_4$ and each of the embeddings that are assigned a bit value of zero in the first bit 1202-1, a bit value of one in the second bit 1202-2, and a bit value of one in the third bit 1202-3. The sixth projection threshold value $th_{4-6}$ is computed as the cosine value between the fourth projection vector $P_4$ and each of the embeddings that are assigned a bit value of zero in the first bit 1202-1, a bit value of one in the second bit 1202-2, and a bit value of zero in the third bit 1202-3. The seventh projection threshold value $th_{4-7}$ is computed as the median cosine value between the fourth projection vector $P_4$ and each of the embeddings that are assigned a bit value of zero in the first bit 1202-1, a bit value of zero in the second bit 1202-2, and a bit value of one in the third bit 1202-3. The eighth projection threshold value $th_4$-s is computed as the median cosine value between the fourth projection vector $P_4$ and each of the embeddings that are assigned a bit value of zero in the first bit 1202-1, a bit value of zero in the second bit 1202-2, and a bit value of zero in the third bit 1202-3.

Accordingly, for each bit value of a bit following the first bit of the term, the bit value is dependent upon the bit values assigned to prior bits of the term. However, upon reaching a bit of a new term, the example process starts over and the first bit value of the term only includes a single threshold value.

For example, Term 2 1201-2 of the binary representation structure 1200 includes randomly selected but orthogonal projection vectors $P_5$, $P_6$, $P_7$, and $P_8$. Likewise, for the first bit 1202-5 of the second term 1201-2, a projection threshold value $th_5$ is determined as the median cosine value between the projection vector $P_5$ and the embeddings of the multi-dimensional space, as discussed above. For the second bit 1202-6 of the second term 1201-2, a first projection threshold value $th_{6-1}$ is computed as the median cosine value between the projection vector $P_6$ and the embeddings that were assigned a bit value of one in the prior bit 1201-5. Likewise, a second projection threshold value $th_{6-2}$ is also computed for the second bit 1202-6 of the second term 1201-2 as the median cosine value between the projection vector $P_6$ and the embeddings that were assigned a bit value of zero in the prior bit 1201-5.

Continuing, the third bit 1202-7 of the second term 1201-2 is associated with projection vector $P_7$ and four projection threshold values are computed for the third bit 1202-7 of the second term 1201-2. The first projection threshold value $th_{7-1}$ is computed as the median cosine value between the projection vector $P_7$ and each of the embeddings that are assigned a bit value of one in the first bit 1202-5 and a bit value of one in the second bit 1202-6. The second projection threshold value $th_{7-2}$ is computed as the median cosine value between the projection vector $P_7$ and each of the embeddings that are assigned a bit value of one in the first bit 1202-5 and a bit value of zero in the second bit 1202-6. The third projection threshold value $th_{7-3}$ is computed as the median cosine value between the projection vector $P_7$ and each of the embeddings that are assigned a bit value of zero in the first bit 1202-5 and a bit value of one in the second bit 1202-6. The fourth projection threshold value $th_{7-4}$ is computed as the median cosine value between the projection vector $P_7$ and each of the embeddings that are assigned a bit value of zero in the first bit 1202-5 and a bit value of zero in the second bit 1202-6.

The fourth bit 1202-8 of the second term 1201-2 is associated with the projection vector $P_8$ and eight projection threshold values are computed for the fourth bit 1202-8 of the second term 1201-2. The first projection threshold value $th_{8-1}$ is computed as the median cosine value between the projection vector $P_8$ and each of the embeddings that are assigned a bit value of one in the first bit 1202-5, a bit value of one in the second bit 1202-6, and a bit value of one in the third bit 1202-7. The second projection threshold value $th_{8-2}$ is computed as the median cosine value between the projection vector $P_8$ and each of the embeddings that are assigned a bit value of one in the first bit 1202-5, a bit value of one in the second bit 1202-6, and a bit value of zero in the third bit 1202-7. The third projection threshold value $th_{8-3}$ is computed as the median cosine value between the projection vector $P_8$ and each of the embeddings that are assigned a bit value of one in the first bit 1202-5, a bit value of zero in the second bit 1202-6, and a bit value of one in the third bit 1202-7. The fourth projection threshold value $th_{8-4}$ is computed as the median cosine value between the projection vector $P_8$ and each of the embeddings that are assigned a bit value of one in the first bit 1202-5, a bit value of zero in the second bit 1202-6, and a bit value of zero in the third bit 1202-6. The fifth projection threshold value $th_{8-5}$ is computed as the median cosine value between the projection vector $P_8$ and each of the embeddings that are assigned a bit value of zero in the first bit 1202-5, a bit value of one in the second bit 1202-6, and a bit value of one in the third bit 1202-7. The sixth projection threshold value $th_{8-6}$ is computed as the median cosine value between the projection vector $P_8$ and each of the embeddings that are assigned a bit value of zero in the first bit 1202-5, a bit value of one in the second bit 1202-6, and a bit value of zero in the third bit 1202-7. The seventh projection threshold value $th_{8-7}$ is computed as the median cosine value between the projection vector $P_8$ and each of the embeddings that are assigned a bit value of zero in the first bit 1202-5, a bit value of zero in the second bit 1202-6, and a bit value of one in the third bit 1202-7. The eighth projection threshold value $th_{8-8}$ is computed as the median cosine value between the projection vector $P_8$ and each of the embeddings that are assigned a bit value of zero in the first bit 1202-5, a bit value of zero in the second bit 1202-6, and a bit value of zero in the third bit 1202-7.

Returning to FIG. 10, upon determining a projection threshold value for the next bit, a determination is made as to whether a projection vector and corresponding projection threshold values have been determined for each bit of the term, as in 1014. If it is determined that a projection vector and projection threshold values have not been determined for each bit of the term, the example process returns to block 1010, selects an orthogonal projection vector for the next bit of the term and continues. If it is determined that a projection vector and corresponding projection threshold values have been computed for each bit of the term, a determination is made as to whether there are additional terms for which projection vectors and projection vectors thresholds need to be computed for the bits of those terms, as in 1016. If it is determined that additional terms remain, the example process 1000 returns to block 1004 and continues. If it is determined that all terms have been processed for the binary representation structure, the example process completes, as in 1018.

Figure 11:
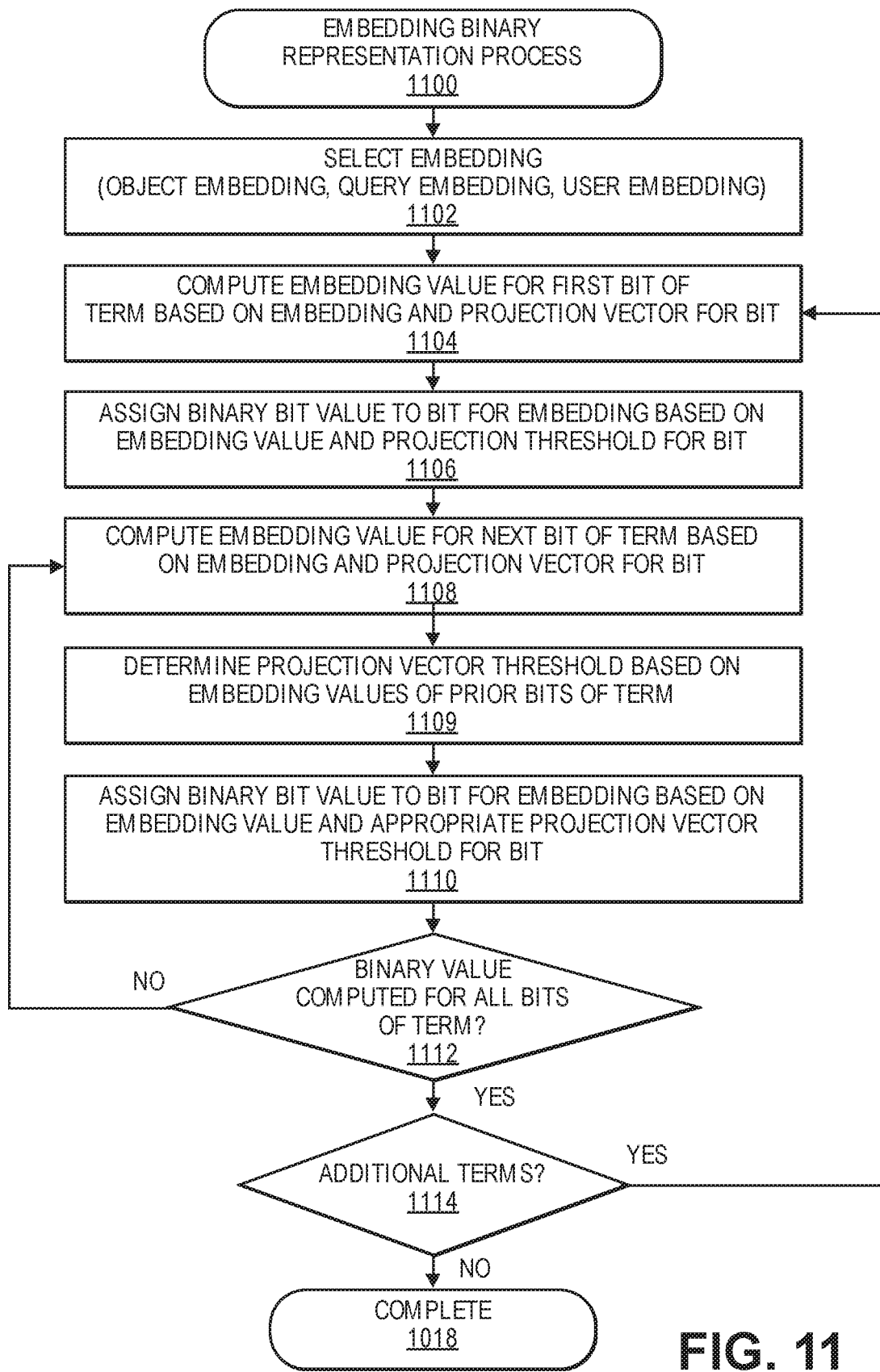
FIG. 11 is another example binary representation process, according to described implementations.

FIG. 11 is another example embedding binary representation process 1100, according to described implementations. The example process may be performed for any embedding of a set of embeddings to convert the embedding into a binary representation. The example process 1100 may be performed with a binary representation structure that includes one or more terms, each term having two or more bits, such as a binary representation structure generated by the example process 1000 (FIG. 10).

The example process 1100 begins by selecting an embedding to represent as a binary representation, as in 1102. As discussed above, the embedding may be any form of information, including, but not limited to, images, groups of images, user profiles, queries, etc.

Utilizing the projection vectors randomly selected for the bits of the binary representation structure, as discussed above with respect to FIG. 10, an embedding value is computed for a first bit of a term of the binary representation as a cosine value of an angle between the projection vector associated with that bit and the continuous value of the embedding, as in 1104. Based on the embedding value, a binary bit value is assigned to the bit for that term of the embedding based on whether the computed embedding value is above or below the projection threshold value computed for that bit (FIG. 10), as in 1106. For example, if the embedding value is above the projection threshold value for that bit, the bit may be assigned a binary value of one (1). If the embedding value is below the projection threshold value for that bit, the bit may be assigned a binary value of zero (0).

As discussed above, because the projection threshold value for the bit is set at a median cosine value for the set of embeddings of the multi-dimensional object space, approximately half of the embeddings will be assigned a value of one and approximately half of the embeddings will be assigned a value of zero, thereby balancing the distribution of the embeddings between the two buckets.

After computing the bit value for the bit of the term, an embedding value for the next bit of the term is computed as a cosine value of the angle between the projection vector associated with that bit and the continuous value of the embedding, as in 1108. A projection threshold value for the bit is also determined based on the bit values assigned to prior bits of that term, as in 1109. As discussed above, each bit may have $2^{N-1}$ projection threshold values which are selected based on the bit value assigned to prior bits of the term.

Figure 12:
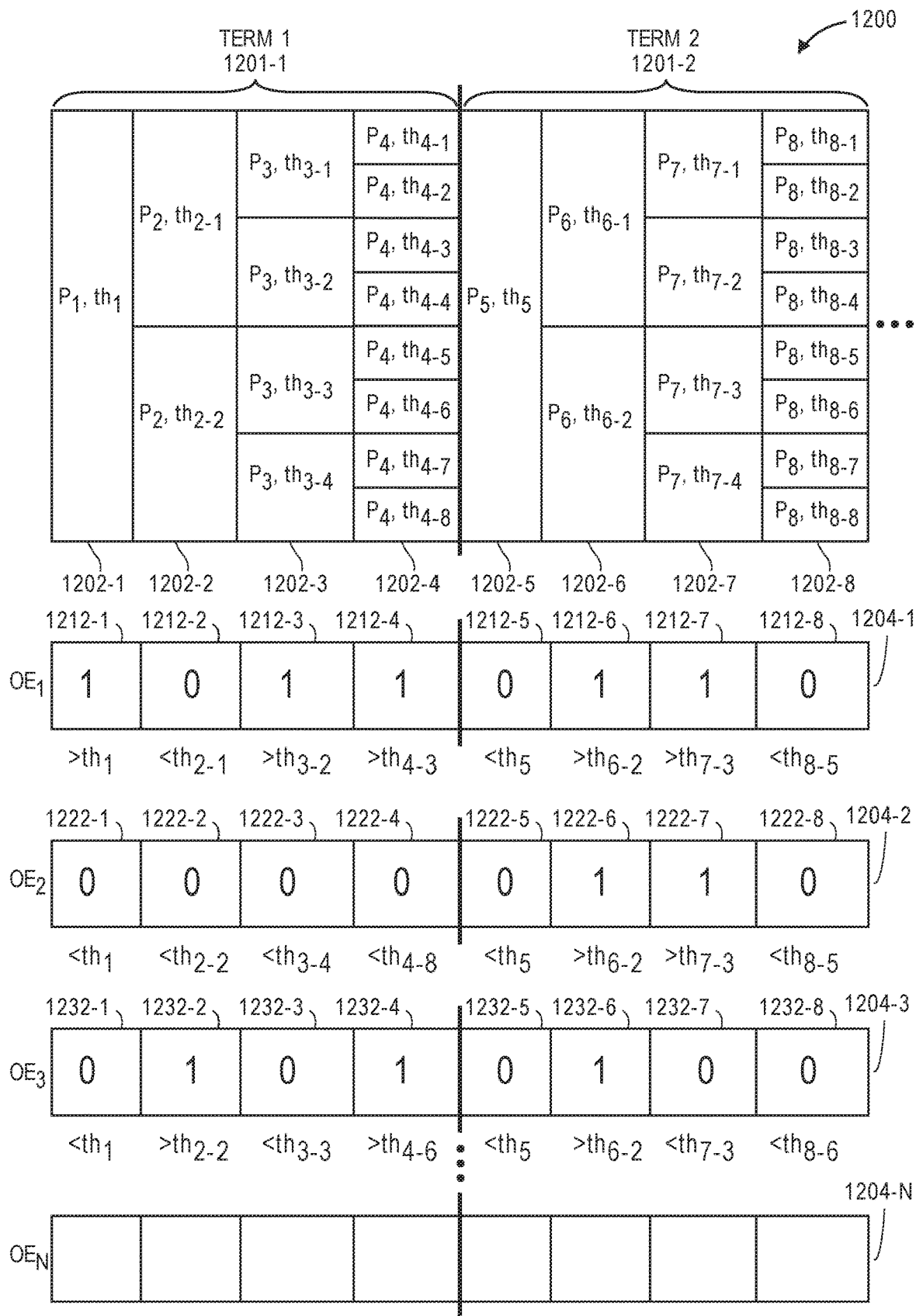
FIG. 12 is another block diagram of a sample index of binary representations of embeddings, according to described implementations.

For example, referring to FIG. 12, illustrated are example binary representation 1204-1 formed for embeddings OE1, OE2, and OE3. As illustrated any binary representations may be formed for any number of embeddings, such as embeddings OE1, OE2, OE3 through OEN.

In this example, every embedding of the set may be represented by eight bits 1202-1, 1202-2, 1202-3, 1202-4, 1202-5, 1202-6, 1202-7, and 1202-8. As discussed above, for each bit, a projection vector may be randomly selected that is orthogonal to other projection vectors randomly selected for other bits of the binary representation structure 1200. For example, bit one 1202-1 is associated with projection vector $P_1$, which may be randomly selected. Bit two 1202-2 is associated with projection vector $P_2$, which may be randomly selected and orthogonal to projection vector $P_1$. Bit three 1202-3 is associated with projection vector $P_3$, which may be randomly selected and orthogonal to projection vectors $P_1$ and $P_2$. Bit four 1202-4 is associated with projection vector $P_4$, which may be randomly selected and orthogonal to projection vectors $P_1$, $P_2$, and $P_3$. Bit five 1202-5 is associated with projection vector $P_5$, which may be randomly selected and orthogonal to projection vectors $P_1$, $P_2$, $P_3$, and $P_4$. Bit six 1202-6 is associated with projection vector $P_6$, which may be randomly selected and orthogonal to projection vectors $P_1$, $P_2$, $P_3$, $P_4$, and $P_5$. Bit seven 1202-7 is associated with projection vector $P_7$, which may be randomly selected and orthogonal to projection vectors $P_1$, $P_2$, $P_3$, $P_4$, $P_5$, and $P_6$. Bit eight 1202-8 is associated with projection vector $P_8$, which may be randomly selected and orthogonal to projection vectors $P_1$, $P_2$, $P_3$, $P_4$, $P_5$, $P_6$, and $P_7$.

Likewise, the bits may be segmented into terms, such as term 1 1201-1, which includes bits 1202-1, 1202-2, 1202-3, and 1202-4, and term 2, which includes bits 1202-5, 1202-6, 1202-7, and 1202-8. Likewise, for each bit of a term, $2^{N-1}$ projection threshold values may be computed, as discussed above.

Utilizing the binary representation structure 1200, each embedding such as OE1, OE2, OE3 through OEN may be converted from continuous data, as discussed above, to a binary representation 1204 and indexed in a data store. For example, referring first to embedding OE1, for the first bit 1212-1, a cosine value of the angle between the continuous data of object embedding OE and the projection vector $P_1$ may be computed and a binary value assigned based on whether that cosine value is greater than or less than the projection threshold value $th_1$. In this example, it is determined that the cosine value is greater than the projection threshold value $th_1$ and a binary representation of one (1) is assigned to the first bit 1212-1 for embedding OE1. For the second bit 1212-2, a cosine value of the angle between the continuous data of object embedding OE and the projection vector $P_2$ may be computed and a binary value assigned based on whether that cosine value is greater than or less than the projection threshold value $th_{2-1}$, which is utilized because the first bit 1212-1 is assigned a value of one. In this example, it is determined that the cosine value is less than the projection threshold value $th_{2-1}$ and a binary representation of zero (0) is assigned to the second bit 1212-2 for embedding OE1. For the third bit 1212-3, a cosine value of the angle between the continuous data of object embedding OE and the projection vector $P_3$ may be computed and a binary value assigned based on whether that cosine value is greater than or less than the projection threshold value $th_{3-2}$, which is utilized because the first bit 1212-1 is assigned a value of one and the second bit 1212-2 is assigned a value of zero. In this example, it is determined that the cosine value is greater than the projection threshold value $th_3$ and a binary representation of one (1) is assigned to the third bit 1212-3 for embedding OE1. For the fourth bit 1212-4, a cosine value of the angle between the continuous data of object embedding OE and the projection vector $P_4$ may be computed and a binary value assigned based on whether that cosine value is greater than or less than the projection threshold value $th_{4-3}$, which is utilized because the first bit 1212-1 is assigned a value of one, the second bit 1212-2 is assigned a value of zero, and the third bit 1212-3 is assigned a value of one. In this example, it is determined that the cosine value is greater than the projection threshold value $th_{4-3}$ and a binary representation of one (1) is assigned to the fourth bit 1212-4 for embedding OE1. For the fifth bit 1212-5, which is the first bit of term 2, a cosine value of the angle between the continuous data of object embedding OE and the projection vector $P_5$ may be computed and a binary value assigned based on whether that cosine value is greater than or less than the projection threshold value $th_5$. In this example, it is determined that the cosine value is less than the projection threshold value $th_5$ and a binary representation of zero (0) is assigned to the fifth bit 1212-5 for embedding OE1. For the sixth bit 1212-6, a cosine value of the angle between the continuous data of object embedding OE and the projection vector $P_6$ may be computed and a binary value assigned based on whether that cosine value is greater than or less than the projection threshold value $th_{6-2}$, which is utilized because the fifth bit 1212-5, which is the first bit of term 2, is assigned a value of zero. In this example, it is determined that the cosine value is greater than the projection threshold value $th_{6-2}$ and a binary representation of one (1) is assigned to the sixth bit 1212-6 for embedding OE1. For the seventh bit 1212-7, a cosine value of the angle between the continuous data of object embedding OE and the projection vector $P_7$ may be computed and a binary value assigned based on whether that cosine value is greater than or less than the projection threshold value $th_{7-3}$, which is utilized because the fifth bit 1212-5 is assigned a value of zero and the sixth bit 1212-6, which is the second bit of term 2, is assigned a value of one. In this example, it is determined that the cosine value is greater than the projection threshold value $th_{7-3}$ and a binary representation of one (1) is assigned to the seventh bit 1212-7 for embedding OE1. For the eighth bit 1212-8, a cosine value of the angle between the continuous data of object embedding OE and the projection vector $P_8$ may be computed and a binary value assigned based on whether that sum is greater than or less than the projection threshold value $th_{8-5}$, which is utilized because the fifth bit 1212-5, which is the first bit of term 2, is assigned a value of zero, the sixth bit 1212-6, which is the second bit of term 2, is assigned a value of one, and the seventh bit 1212-7, which is the third bit of term 2, is assigned a value of one. In this example, it is determined that the cosine value is less than the projection threshold value $th_{8-5}$ and a binary representation of zero (0) is assigned to the eighth bit 1212-8 for embedding OE1. After a binary value is assigned to each bit, as discussed, the binary representation for OE1 may be indexed and stored.

The process described for embedding OE1 may be performed for each embedding of a set of embeddings of a multi-dimensional space, such as OE1, OE2, OE3 through OEN, such that a binary value may be assigned to each bit and representative of that embedding for that bit. Similar to the assignment of binary values discussed above with respect to OE1, the projection vectors and projection threshold values determined for each bit of the binary representation structure 1200 may be utilized to assign binary values to each of the other embeddings of the set of embeddings.

In this example, embedding OE2 may be represented as binary representation 1204-2 in which the first bit 1222-1 is assigned a value of zero, the second bit 1222-2 is assigned a value of zero, the third bit 1222-3 is assigned a value of zero, the fourth bit is assigned a value of zero (0), the fifth bit is assigned a value of one, the sixth bit 1222-6 is assigned a value of one, the seventh bit 1222-7 is assigned a value of one, and the eighth bit 1222-8 is assigned a value of zero.

In a similar manner, embedding OE3 may be represented as a binary representation 1204-3 in which the first bit 1232-1 is assigned a value of zero (0), the second bit 1232-2 is assigned a value of one (1), the third bit 1232-3 is assigned a value of zero (0), the fourth bit 1232-4 is assigned a value of one (1), the fifth bit 1232-5 is assigned a value of zero (0), the sixth bit 1232-6 is assigned a value of one (1), the seventh bit 1232-7, is assigned a value of zero (0), and the eight bit 1232-8 is assigned a value of zero (0).

The process of converting continuous data to binary representations that are indexed may be performed for each embedding of a set and/or each embedding added to a set. Likewise, while the described example illustrates eight bits, any number of bits may be included in the binary representation structure and corresponding binary representations. Likewise, because each bit is independently computed, additional bits may be added to a binary representation and computed independent of other bits of the binary representation.

Returning to FIG. 11, after assigning a bit value to the bit of the term, a determination may be made as to whether a binary value has been computed for each bit of the term of the binary representation for the selected embedding, as in 1112. If it is determined that a binary value has not been computed for each bit of the term, the example process 1100 returns to block 1108 and continues for the next bit of the term of the binary representation. If it is determined that a binary value has been computed for all bits of the term of the binary representation, a determination is made as to whether there are additional terms for which bits need assigned binary values, as in 1114. If it is determined that additional terms remain for which bit values are to be computed, the example process 1100 returns to block 1104, selects the first bit of the next term, and continues. Finally, if it is determined that bit values have been assigned to all bits of all terms of the binary representation for the embedding, the example process 1100 completes, as in 1018.

By segmenting the binary representation into terms, binary values for bits of each term may be computed independently and the terms combined to form the binary representation for the structure.

Figure 13:
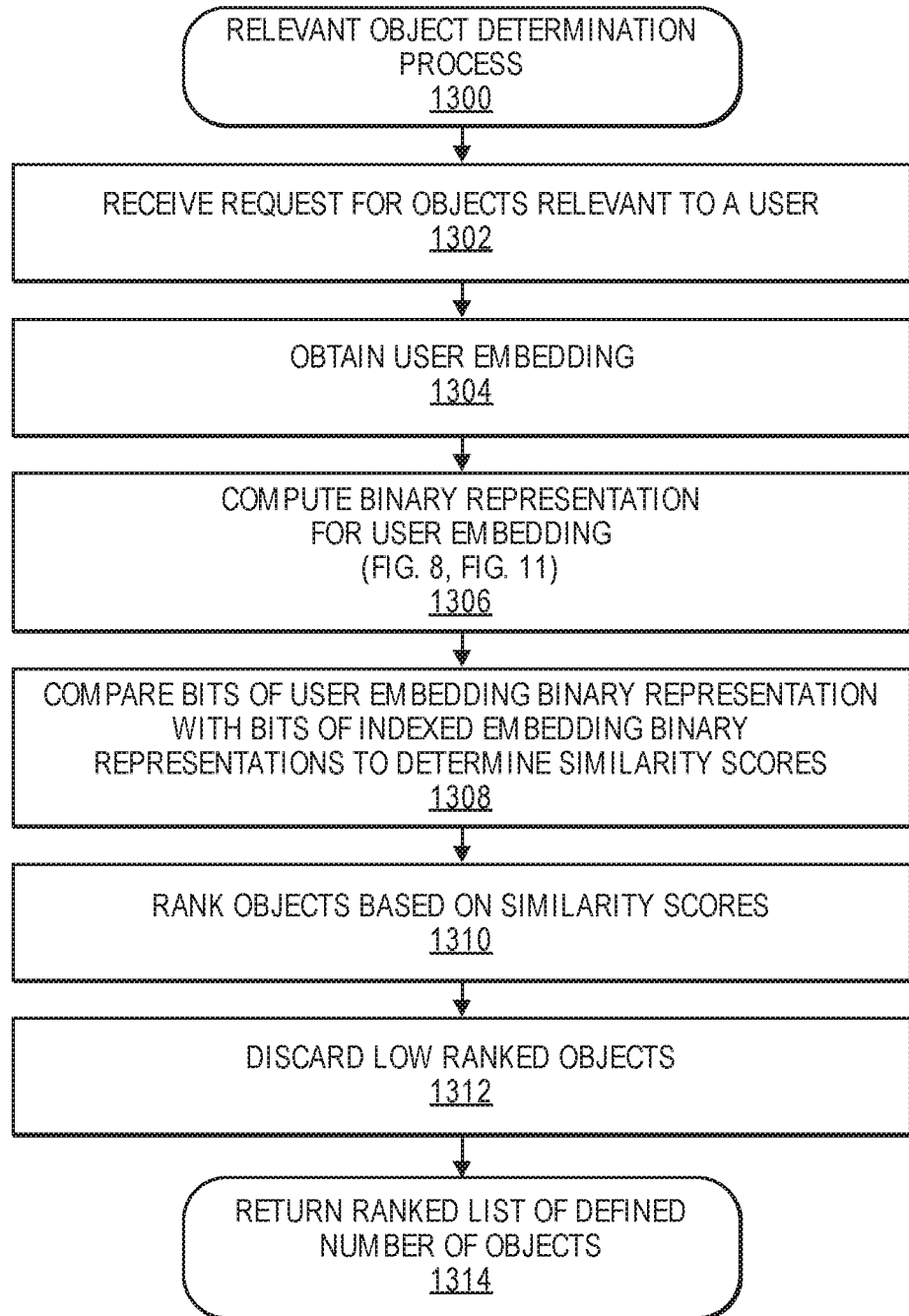
FIG. 13 is an example relevant object determination process, according to described implementations.

FIG. 13 is an example of another relevant object determination process 1300, according to described implementations. The example process 1300 begins upon receipt of a request for objects that are potentially relevant to the user, as in 1302. Such a request may be received anytime objects are to be sent to a user device for presentation. For example, a request for objects may be initiated each time a user accesses an application on their user device through which objects are presented to the user.

Upon receipt of a request, the user embedding generated for the user according to the example process 300 discussed with respect to FIG. 3 is obtained or generated according to the example process 300 (FIG. 3), as in 1304. The continuous data of the user embedding may then be utilized to compute a user binary representation representative of the user embedding, as in 1306. The continuous data may be converted to a binary representation using either of the embedding binary representation processes discussed above with respect to FIGS. 8 and 11.

Upon conversion of the user embedding to a user binary representation, the user binary representation may be compared to indexed binary representations representative of object embeddings to determine similarity scores indicating a similarity between the user binary representation and each indexed binary representation, as in 1308. The similarity scores may be computed based on the number of bits and/or terms of compared binary representations that have the same binary value. For example, if a user binary representation included eight bits in which the first bit is one, the second bit is zero, the third bit is one, the fourth bit is one, the fifth bit is one, the sixth bit is zero, the seventh bit is one and the eighth bit is one (1, 0, 1, 1, 1, 0, 1, 1), when compared with binary representations for OE1, OE2, and OE3, illustrated in FIG. 12, the embedding OE1 would have the highest similarity score because there are five bits that have the same bit value between the user binary representation and the embedding binary representation for OE1. OE2 would receive the second highest score with two bits having the same bit values, and OE3 would receive the lowest similarity score with only one bit having the same value.

As discussed above, each binary representation may have hundreds of bits and/or terms and there may be millions, billions, or more indexed binary representations representative of embeddings. In such instances, to speed processing of the comparisons, different terms of binary representations may be processed by different computing systems in parallel and the results combined to determine a similarity score for each indexed binary representation. For example, if each binary representation includes one thousand terms, with fifteen bits per term, for a total of fifteen thousand bits, some or all of the terms may be processed by different machines and compared by those different machines with the corresponding terms of the indexed binary representations to determine similarity scores for the respective terms. As similarity scores for each term are computed, the similarity scores for each term of a binary representation may be combined, for example summed, to compute a similarity score representative of the similarity between the two compared binary representations.

Returning to FIG. 13, in some implementations, objects corresponding to low similarity scores may be discarded or otherwise removed from consideration, as in 1312. Finally, objects corresponding to object embeddings have the highest similarity scores are returned for presentation to the user via a display of the user device, as in 1314. In some implementations, a defined number of objects may be returned. In other implementations, the number of objects returned may be limited to include only those having a corresponding similarity score that is above a defined threshold. In still another example, the number of highest ranking objects returned may be determined based on a user preference and/or based on the size and/or type of user device.

Figure 14:
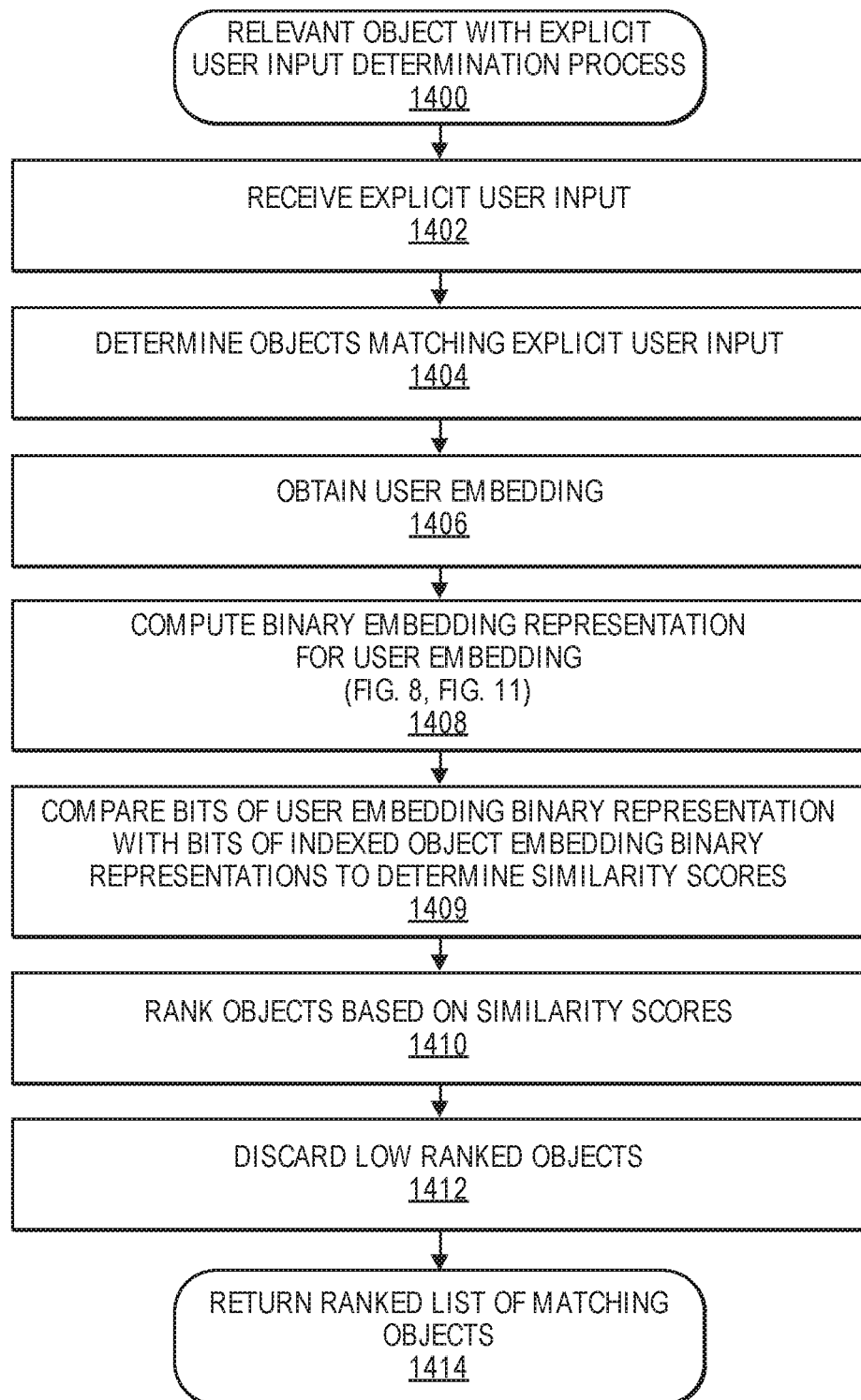
FIG. 14 is an example relevant object with explicit user input determination process, according to described implementations.

FIG. 14 is an example relevant object with explicit user input determination process 1400, according to described implementations. The example process 1400 begins upon receipt of an explicit input, such as a text based search query or visual based query, as in 1402. Upon receipt of an explicit user input, the object data store is processed to determine objects that match the explicit user input, as in 1404. For example, if the user input is a keyword search request, the object data store may be queried to identify objects that include keywords matching the provided search query. As another example, if the explicit user input is a visual search request, such as the user submitting or selecting an image for which other visually similar images are to be returned, the object data store may be queried to identify objects that are visually similar to the provided or selected image.

The example process 1400 also obtains the user embedding generated for the user according to the example process 300 discussed with respect to FIG. 3 is obtained or generated according to the example process 300 (FIG. 3), as in 1406.

The continuous data of the user embedding may then be utilized to compute a user binary representation representative of the user embedding according, as in 1408. The continuous data may be converted to a binary representation using either of the embedding binary representation processes discussed above with respect to FIGS. 8 and 11.

Upon conversion of the user embedding to a user binary representation, the user binary representation may be compared to indexed binary representations representative of object embeddings corresponding to the objects determined to match the explicit user input to determine similarity scores indicating a similarity between the user binary representation and each object matching the explicit user input, as in 1409. The similarity scores may be computed based on the number of bits and/or terms of compared binary representations that have the same binary value. For example, if a user binary representation includes eight bits in which the first bit is one, the second bit is zero, the third bit is one, the fourth bit is one, the fifth bit is one, the sixth bit is zero, the seventh bit is one and the eighth bit is one (1, 0, 1, 1, 1, 0, 1, 1), when compared with binary representations for OE1, OE2, and OE3, of FIG. 12, assuming that OE1, OE2, and OE3 match the explicit user input, the embedding OE would have the highest similarity score because there are five bits that have the same bit value between the user binary representation and the embedding binary representation for OE1. OE2 would receive the second highest score with two bits having the same bit values, and OE3 would receive the lowest similarity score with only one bit having the same value.

As discussed above, each binary representation may have hundreds of bits and/or terms and there may be hundreds, thousands, or more indexed binary representations representative of embeddings that match the explicit user input. In such instances, to speed processing of the comparisons, different terms of binary representations may be processed by different computing systems in parallel and the results combined to determine a similarity score for each indexed binary representation. For example, if each binary representation includes one thousand terms, with fifteen bits per term, for a total of fifteen thousand bits, some or all of the terms may be processed by different machines and compared by those different machines with the corresponding terms of the indexed binary representations to determine similarity scores for the respective terms. As similarity scores for each term are computed, the similarity scores for each term of a binary representation may be combined, for example summed, to compute a similarity score representative of the similarity between the two compared binary representations.

Returning to FIG. 14, in some implementations, objects corresponding to low similarity scores may be discarded or otherwise removed from consideration, as in 1412. Finally, objects corresponding to object embeddings have the highest similarity scores are returned for presentation to the user via a display of the user device, as in 1414. In some implementations, a defined number of objects may be returned. In other implementations, the number of objects returned may be limited to include only those having a corresponding similarity score that is above a defined threshold. In still another example, the number of highest ranking objects returned may be determined based on a user preference and/or based on the size and/or type of user device.

Figure 15:
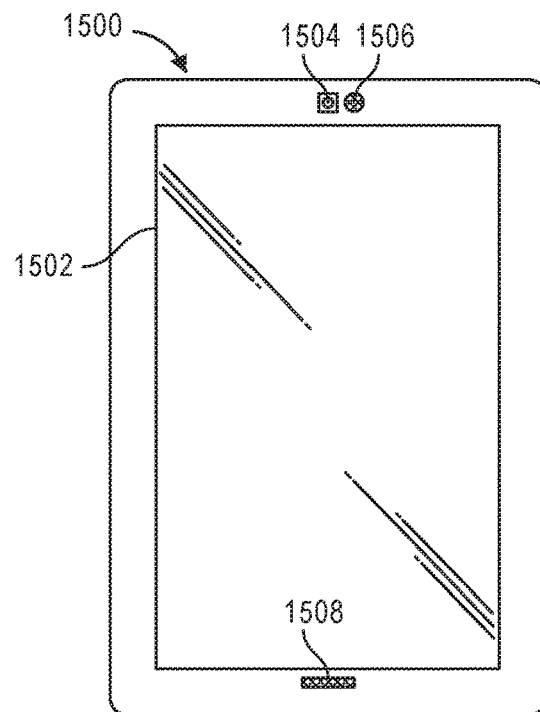
FIG. 15 illustrates an example computing device, according to described implementations.

FIG. 15 illustrates an example user device 1500 that can be used in accordance with various implementations described herein. In this example, the user device 1500 includes a display 1502 and optionally at least one input component 1504, such as a camera, on a same and/or opposite side of the device as the display 1502. The user device 1500 may also include an audio transducer, such as a speaker 1506, and optionally a microphone 1508. Generally, the user device 1500 may have any form of input/output components that allow a user to interact with the user device 1500. For example, the various input components for enabling user interaction with the device may include a touch-based display 1502 (e.g., resistive, capacitive), camera, microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 16:
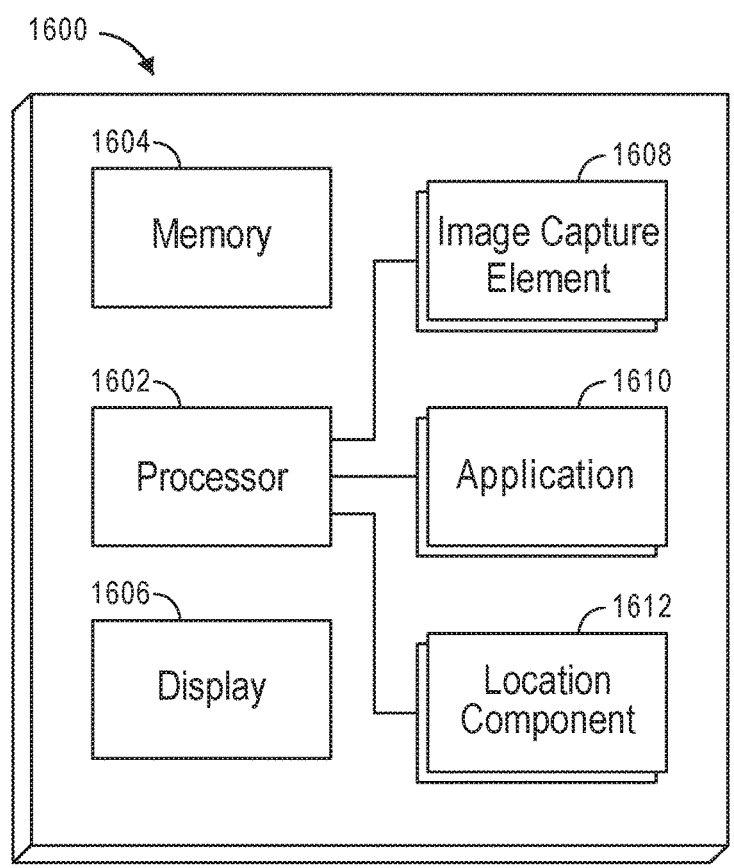
FIG. 16 illustrates an example configuration of components of a computing device, such as that illustrated in FIG. 15.

In order to provide the various functionality described herein, FIG. 16 illustrates an example set of basic components 1600 of a user device 1500, such as the user device 1500 described with respect to FIG. 15 and discussed herein. In this example, the device includes at least one central processor 1602 for executing instructions that can be stored in at least one memory device or element 1604. As would be apparent to one of ordinary skill in the art, the device can include many types of memory, data storage or computer-readable storage media, such as a first data storage for program instruction for execution by the processor 1602. Removable storage memory can be available for sharing information with other devices, etc. The device typically will include some type of display 1606, such as a touch-based display, electronic ink (e-ink), organic light emitting diode (OLED), or liquid crystal display (LCD).

As discussed, the device in many implementations will include at least one image capture element 1608, such as one or more cameras that are able to image objects in the vicinity of the device. An image capture element can include, or be based at least in part upon, any appropriate technology, such as a CCD or CMOS image capture element having a determined resolution, focal range, viewable area, and capture rate. The device can include at least one search component 1610 for performing the process of generating search terms, labels and/or identifying and presenting results matching a selected search term. For example, the user device may be in constant or intermittent communication with a remote computing resource and may exchange information, such as selected search terms, images, labels, etc., with the remote computing system as part of the search process.

The device also can include at least one location component 1612, such as GPS, NFC location tracking or Wi-Fi location monitoring. Location information obtained by the location component 1612 may be used with the various implementations discussed herein as a factor in determining a user embedding. For example, if the user is in San Francisco and provides a positive selection of a bridge (object) represented in an image, the user's location and the bridge may be considered as attributes when generated the user embedding.

The example user device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations.

Figure 17:
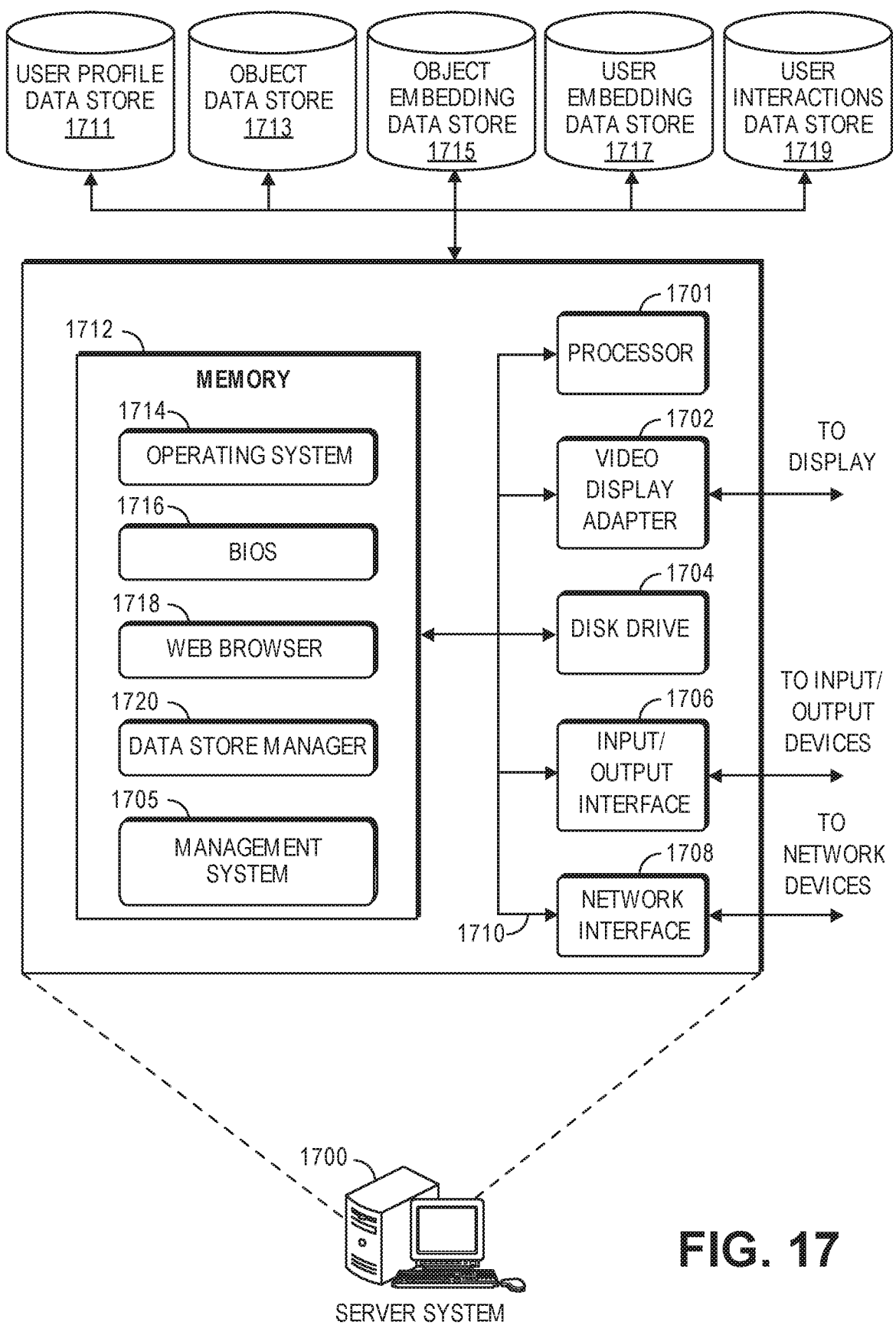
FIG. 17 is a pictorial diagram of an illustrative implementation of a server system that may be used for various implementations.

FIG. 17 is a pictorial diagram of an illustrative implementation of a server system 1700, such as a remote computing resource, that may be used with one or more of the implementations described herein. The server system 1700 may include a processor 1701, such as one or more redundant processors, a video display adapter 1702, a disk drive 1704, an input/output interface 1706, a network interface 1708, and a memory 1712. The processor 1701, the video display adapter 1702, the disk drive 1704, the input/output interface 1706, the network interface 1708, and the memory 1712 may be communicatively coupled to each other by a communication bus 1710.

The video display adapter 1702 provides display signals to a local display permitting an operator of the server system 1700 to monitor and configure operation of the server system 1700. The input/output interface 1706 likewise communicates with external input/output devices, such as a mouse, keyboard, scanner, or other input and output devices that can be operated by an operator of the server system 1700. The network interface 1708 includes hardware, software, or any combination thereof, to communicate with other computing devices. For example, the network interface 1708 may be configured to provide communications between the server system 1700 and other computing devices, such as the user device 1500.

The memory 1712 generally comprises random access memory (RAM), read-only memory (ROM), flash memory, and/or other volatile or permanent memory. The memory 1712 is shown storing an operating system 1714 for controlling the operation of the server system 1700. A binary input/output system (BIOS) 1716 for controlling the low-level operation of the server system 1700 is also stored in the memory 1712.

The memory 1712 additionally stores program code and data for providing network services that allow user devices 1500 and external sources to exchange information and data files with the server system 1700. Accordingly, the memory 1712 may store a browser application 1718. The browser application 1718 comprises computer executable instructions, that, when executed by the processor 1701, generate or otherwise obtain configurable markup documents such as Web pages. The browser application 1718 communicates with a data store manager application 1720 to facilitate data exchange and mapping between the data stores, user devices, such as the user device 1500, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 1700 can include any appropriate hardware and software for integrating with the data stores, such as the user profile data store 1711, object data store 1713, object embedding data store 1715, user embedding data store 1717, and/or user interactions data store 1719, as needed to execute aspects of one or more applications for the user device 1500, the external sources and/or the management service 1705.

As discussed herein, the user profile data store 1711 may include long-term information about users. For example, as illustrated in FIGS. 1A and 1B, user profile information may include information indicating the age of the user, race of the user, food preference of the user, color preference of the user, location of the user, residence of the user, access frequency of the user, devices used by the user, etc. The object data store 1713 may include objects accessible to users through a network and/or via the management service. Also, as discussed herein, the object embeddings data store 1715 may include embeddings of objects (e.g., stored objects, collections of objects, explicit inputs represented by object embeddings, etc.). Likewise, the user embedding data store 1717 may include user embeddings representative of a blend of long term user behavior and short-term interest or intent of t the user, as discussed herein. Finally, the user interactions data store 1719 may include information indicating interactions by the user with objects maintained in the object data store. As discussed above, such user interaction information may be utilized with a user profile embedding to produce the user embedding.

The data stores 1711, 1713, 1715, 1717, 1719 can include several separate data tables, databases or other data storage mechanisms and media for storing data relating to a particular aspect. Likewise, while the example illustrates five separate data stores, it will be appreciated that the data may be combined into fewer data store or spread across additional data stores. It should be understood that there can be many other aspects that may be stored in the data stores, which can be stored in any of the above listed mechanisms as appropriate or in additional mechanisms of any of the data stores. The data stores may be operable, through logic associated therewith, to receive instructions from the server system 1700 and obtain, update or otherwise process data in response thereto.

The memory 1712 may also include the management service 1705. The management service 1705 may be executable by the processor 1701 to implement one or more of the functions of the server system 1700. In one implementation, the management service 1705 may represent instructions embodied in one or more software programs stored in the memory 1712. In another implementation, the management service 1705 can represent hardware, software instructions, or a combination thereof. The management service 1705 may perform some or all of the implementations discussed herein, alone or in combination with other devices, such as the user device 1500.

The server system 1700, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 17. Thus, the depiction in FIG. 17 should be taken as illustrative in nature and not limiting to the scope of the disclosure.

The concepts disclosed herein may be applied within a number of different devices and computer systems, including, for example, general-purpose computing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the art should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," "similar," or "substantially" as used herein, represent a value, amount, or characteristic close to the stated value, amount, or characteristic that still performs a desired function or achieves a desired result. For example, the terms "about," "approximately," "generally," "nearly," "similar," or "substantially" may refer to an amount that is within less than 10% of, within less than 5% of, within less than 1% of, within less than 0.1% of, and within less than 0.01% of the stated amount.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   defining, by a management service executing on one or more computing resources, for a plurality of object embeddings for a plurality of stored objects, a binary representation structure, the binary representation structure including a plurality of bits;
   selecting, by the management service, for a first bit of the binary representation structure, a first random projection vector;
   determining, by the management service, for the first bit, a first projection threshold value such that approximately half of the plurality of object embeddings are assigned a first binary value for the first bit and approximately half of the plurality of object embeddings are assigned a second binary value for the first bit, wherein the first binary value is different than the second binary value;

selecting, by the management service, for a second bit of the binary representation structure, a second random projection vector;

determining, by the management service, for the second bit, a second projection threshold value such that approximately half of the plurality of object embeddings are assigned the first binary value for the second bit and approximately half of the plurality of object embeddings are assigned the second binary value for the second bit;

selecting, by the management service, an object embedding of the plurality of object embeddings;

computing, by the management service, a first embedding value for the object embedding based at least in part on an object embedding value corresponding to the object embedding and the first random projection vector corresponding to the first bit of the binary representation structure;

determining, by the management service, that the first embedding value exceeds the first projection threshold value;

assigning, by the management service, the first binary value to a first bit of a binary representation of the object embedding as representative of the object embedding;

computing, by the management service, a second embedding value for the object embedding based at least in part on the object embedding value corresponding to the object embedding and the second random projection vector corresponding to the second bit of the binary representation structure;

determining, by the management service, that the second embedding value does not exceed the second projection threshold value; and assigning, by the management service, the second binary value to a second bit of the binary representation of the object embedding as representative of the object embedding.

2. The computer-implemented method of claim 1, wherein the second random projection vector is orthogonal to the first random projection vector.

3. The computer-implemented method of claim 1, wherein the object embedding includes continuous data representative of an object.

4. The computer-implemented method of claim 1, wherein determining the first projection threshold value includes:
   determining, by the management service, a subset of the plurality of object embeddings;
   computing, by the management service, for each object embedding of the subset of the plurality of object embeddings, a respective embedding value;
   determining, by the management service, a median embedding value from each of the respective embedding values; and
   assigning the median embedding value as the first projection threshold value.

5. The computer-implemented method of claim 1, further comprising:
   indexing, by the management service, the binary representation of the object embedding.

6. A computer-implemented method, comprising:
selecting, by a management service executed on one or more computing resources, for a first bit of a binary representation structure, a first random projection vector;

determining, by the management service, for the first bit, a first projection threshold value that will cause:
   a first sub-plurality of the plurality of object embeddings having embedding values that exceed the first projection threshold value to be assigned a first binary value for the first bit; and
   a second sub-plurality of the plurality of object embeddings having embedding values that do not exceed the first projection threshold value to be assigned a second binary value for the first bit;

selecting, by the management service, for the second bit of the binary representation structure, a second random projection vector;

determining, by the management service, for a second bit of the binary representation structure:
   a second projection threshold value that will cause:
      a third sub-plurality of the first sub-plurality of object embeddings having embedding values that exceed the second projection threshold value to be assigned the first binary value for the second bit; and
      a fourth sub-plurality of the first sub-plurality of the object embeddings having embedding values that do not exceed the second projection threshold value to be assigned the second binary value for the second bit;
   a third projection threshold value that will cause:
      a fifth sub-plurality of the second sub-plurality of object embeddings having embedding values that exceed the third projection threshold value to be assigned the first binary value for the second bit; and
      a sixth sub-plurality of the second sub-plurality of the object embeddings having embedding values that do not exceed the third projection threshold value to be assigned the second binary value for the second bit;

selecting a first object embedding of the plurality of object embeddings;

establishing, by the management service, based on the binary representation structure, a first binary representation for the first object embedding;

computing, by the management service, a first embedding value for the first object embedding based at least in part on a first object embedding value corresponding to the first object embedding and the first random projection vector corresponding to the first bit of the binary representation structure;

determining, by the management service, that the first embedding value exceeds the first projection threshold value;

assigning, by the management service, the first binary value to a first bit of the first binary representation as representative of the first object embedding;

computing, by the management service, a second embedding value for the first object embedding based at least in part on the first object embedding value corresponding to the first object embedding and the second random projection vector corresponding to the second bit of the binary representation structure;

determining, by the management service, based at least in part on the first binary value assigned to the first bit, that the second embedding value is to be compared to the second projection threshold value of the second bit;

determining, by the management service, that the second embedding value exceeds the second projection threshold value; and assigning, by the management service, in response to determining that the second embedding value exceeds the second projection threshold value, the first binary value to a second bit of the first binary representation of the first object embedding as representative of the first object embedding.

7. The computer-implemented method of claim 6, further comprising:

selecting, by the management service, a second object embedding of the plurality of object embeddings;

establishing, by the management service, based on the binary representation structure, a second binary representation for the second object embedding;

computing, by the management service, a third embedding value for the second object embedding based at least in part on a second object embedding value corresponding to the second object embedding and the first random projection vector corresponding to the first bit of the binary representation structure;

determining, by the management service, that the third embedding value does not exceed the first projection threshold value;

assigning, by the management service, the second binary value to a first bit of the second binary representation as representative of the second object embedding;

computing, by the management service, a fourth embedding value for the second object embedding based at least in part on the second object embedding value corresponding to the second object embedding and the second random projection vector corresponding to the second bit of the binary representation structure;

determining, by the management service, based at least in part on the second binary value assigned to the first bit of the second binary representation, that the fourth embedding value is to be compared to the third projection threshold value of the second bit;

determining, by the management service, that the fourth embedding value exceeds the third projection threshold value; and assigning, by the management service, in response to determining that the fourth embedding value exceeds the third projection threshold value, the first binary value to a second bit of the second binary representation of the second object embedding as representative of the second object embedding.

8. The computer-implemented method of claim 6, wherein the first object embedding is representative of at least one of an object, a plurality of objects, an image, a plurality of images, a user, a user input, or a query.

9. The computer-implemented method of claim 6, wherein:

the at least one term further includes at least a third bit; and the method further comprising:

determining, by the management service, for the third bit:

a fourth projection threshold value that will cause:

a seventh sub-plurality of the third sub-plurality of object embeddings that have embedding values that exceed the fourth projection threshold value to be assigned the first binary value for the third bit; and an eighth sub-plurality of the third sub-plurality of object embeddings that have embedding values that do not exceed the fourth projection threshold value to be assigned the second binary value for the third bit;

a fifth projection threshold value that will cause:

a ninth sub-plurality of the fourth sub-plurality of object embeddings that have embedding values that exceed the fifth projection threshold value to be assigned the first binary value for the third bit; and a tenth sub-plurality of the fourth sub-plurality of object embeddings that have embedding values that do not exceed the fifth projection threshold value to be assigned the second binary value for the third bit;

a sixth projection threshold value that will cause:

an eleventh sub-plurality of the fifth sub-plurality of object embeddings that have embedding values that exceed the fifth projection threshold value to be assigned the first binary value for the third bit; and a twelfth sub-plurality of the fifth sub-plurality of object embeddings that have embedding values that do not exceed the fifth projection threshold value to be assigned the second binary value for the third bit; and a seventh projection threshold value that will cause:

a thirteenth sub-plurality of the sixth sub-plurality of object embeddings that have embedding values that exceed the seventh projection threshold value to be assigned the first binary value for the third bit; and a fourteenth sub-plurality of the sixth sub-plurality of object embeddings that have embedding values that do not exceed the seventh projection threshold value to be assigned the second binary value for the third bit.

10. The computer-implemented method of claim 9, wherein the binary representation structure further includes a second term, the second term including at least a fourth bit;

the method further comprising:

selecting, by the management service, for the fourth bit, a fourth random projection vector;

determining, by the management service, for the fourth bit, an eighth projection threshold value that will cause:

a third sub-plurality of the plurality of object embeddings having embedding values that exceed the eighth projection threshold value to be assigned the first binary value for the fourth bit; and a fourth sub-plurality of the plurality of object embeddings having embedding values that do not exceed the eighth projection threshold value to be assigned the second binary value for the fourth bit.

11. The computer-implemented method of claim 10, wherein the eighth projection threshold value is further selected such that approximately half of the plurality of object embeddings are assigned the first binary value for the fourth bit and approximately half of the plurality of object embeddings are assigned the second binary value for the fourth bit.

12. The computer-implemented method of claim 6, wherein the second random projection vector is orthogonal to the first random projection vector.

13. The computer-implemented method of claim 6, wherein computing the first embedding value includes computing a cosine value of an angle between the first object embedding value and the first random projection vector.

14. The computer-implemented method of claim 6, wherein determining for the first bit a first projection threshold value further includes:
determining, for the first bit, the first projection threshold value that will cause approximately half of the plurality of object embeddings to be assigned the first binary value for the first bit and approximately half of the plurality of object embeddings to be assigned the second binary value for the first bit.

15. A non-transitory computer-readable storage medium storing instructions that, when executed by at least one processor of a computing system, cause the computing system to at least:
define, for a plurality of object embeddings, a binary representation structure, the binary representation structure including a plurality of bits;
select, for a first bit of the binary representation structure, a first random projection vector;
determine, for the first bit, a first projection threshold value such that approximately half of the plurality of object embeddings are assigned a first binary value for the first bit and approximately half of the plurality of object embeddings are assigned a second binary value for the first bit, wherein the first binary value is different than the second binary value;
select, for a second bit of the binary representation structure, a second random projection vector;
determine, for the second bit, a second projection threshold value such that approximately half of the plurality of object embeddings are assigned the first binary value for the second bit and approximately half of the plurality of object embeddings are assigned the second binary value for the second bit;
select an object embedding of the plurality of object embeddings;
compute a first embedding value for the object embedding based at least in part on an object embedding value corresponding to the object embedding and the first random projection vector corresponding to the first bit of the binary representation structure;
determine that the first embedding value exceeds the first projection threshold value;
assign the first binary value to a first bit of a binary representation of the object embedding as representative of the object embedding;
compute a second embedding value for the object embedding based at least in part on the object embedding value corresponding to the object embedding and the second random projection vector corresponding to the second bit of the binary representation structure;
determine that the second embedding value does not exceed the second projection threshold value; and
assign the second binary value to a second bit of the binary representation of the object embedding as representative of the object embedding.

16. The non-transitory computer-readable storage medium of claim 15, wherein the second random projection vector is orthogonal to the first random projection vector.

17. The non-transitory computer-readable storage medium of claim 15, wherein the object embedding includes continuous data representative of an object.

18. The non-transitory computer-readable storage medium of claim 15, wherein in determining the first projection threshold value, the execution of the instruction causes the computing system to at least:
determine a subset of the plurality of object embeddings;
compute, for each object embedding of the subset of the plurality of object embeddings, a respective embedding value;
determine a median embedding value from each of the respective embedding values; and
assign the median embedding value as the first projection threshold value.

19. The non-transitory computer-readable storage medium of claim 15, wherein the execution of the instruction further causes the computing system to at least index the binary representation of the object embedding.

* * * * *